United States Patent
Dambrackas et al.

(10) Patent No.: US 8,385,429 B2
(45) Date of Patent: Feb. 26, 2013

(54) VIDEO COMPRESSION ENCODER

(75) Inventors: William A. Dambrackas, Weston, FL (US); Mario Costa, Pembroke Pines, FL (US); George Richard Goodley, Pompano Beach, FL (US)

(73) Assignee: Avocent Corporation, Huntsville, AL (US)

( * ) Notice: Subject to any disclaimer, the term of this patent is extended or adjusted under 35 U.S.C. 154(b) by 1444 days.

(21) Appl. No.: 11/528,569

(22) Filed: Sep. 28, 2006

(65) Prior Publication Data

US 2007/0019743 A1 Jan. 25, 2007

Related U.S. Application Data

(63) Continuation-in-part of application No. 10/260,534, filed on Oct. 1, 2002, now Pat. No. 7,321,623.

(51) Int. Cl.
*H04N 7/12* (2006.01)
*H04N 11/02* (2006.01)

(52) U.S. Cl. ............... 375/240.26; 375/240.01

(58) Field of Classification Search .......... 348/384, 348/415, 416, 391, 393, 394, 417, 418, 409, 348/420, 408; 382/56, 232, 233, 236, 245, 382/253, 239, 238, 240; 375/240, 240.01, 375/240.26, 240.02, 240.2, 240.24, 240.11, 375/240.25, 240.13, 240.18, 240.1

See application file for complete search history.

(56) References Cited

U.S. PATENT DOCUMENTS

| | | | |
|---|---|---|---|
| 3,710,011 A | 1/1973 | Altemus et al. | |
| 3,925,762 A | 12/1975 | Heitlinger et al. | |
| 3,935,379 A | 1/1976 | Thornburg et al. | |
| 4,005,411 A | 1/1977 | Morrin, II | |
| 4,134,133 A | 1/1979 | Teramura et al. | |
| 4,142,243 A | 2/1979 | Bishop et al. | |
| 4,369,464 A | 1/1983 | Temime | |
| 4,384,327 A | 5/1983 | Conway et al. | |

(Continued)

FOREIGN PATENT DOCUMENTS

| | | |
|---|---|---|
| EP | 0395416 | 10/1990 |
| EP | 0495490 | 7/1992 |

(Continued)

OTHER PUBLICATIONS

International Preliminary Examination Report in Corresponding PCT Application No. PCT/US2003/030650, mailed Aug. 25, 2006.

(Continued)

*Primary Examiner* — Behrooz Senfi
(74) *Attorney, Agent, or Firm* — Davidson Berquist Jackson & Gowdey, LLP

(57) ABSTRACT

A video compression encoder which does not require a video frame buffer is disclosed. Without a frame buffer, incoming pixels can not be compared to pixels previously sent to the decoder. Instead, the disclosed encoder only stores check values for groups of pixels sent. If a group's check value has not changed, the encoder sends a command to the decoder not to change that pixel group. Also, without a frame buffer, an incoming video frame can not be captured and later sent to the decoder as network throughput permits. Instead, if throughput is insufficient to send an encoded group of pixels, the encoder leaves the check value for that group unchanged and sends a command instructing the decoder not to change those pixels. This defers updating that group until the next screen update is sent to the decoder. Grouping of pixels can be done in any fashion, for example; a group can be a single video line, a portion of a line, multiple lines or screen rectangles containing portions of multiple lines.

8 Claims, 9 Drawing Sheets

U.S. PATENT DOCUMENTS

| | | | |
|---|---|---|---|
| 4,667,233 A | 5/1987 | Furukawa | |
| 4,764,769 A | 8/1988 | Hayworth et al. | |
| 4,774,587 A | 9/1988 | Schmitt | |
| 4,855,825 A | 8/1989 | Santamaki et al. | |
| 4,873,515 A | 10/1989 | Dickson et al. | |
| 4,959,833 A | 9/1990 | Mercola et al. | |
| 5,046,119 A | 9/1991 | Hoffert et al. | |
| 5,083,214 A | 1/1992 | Knowles | |
| 5,235,595 A | 8/1993 | O'Dowd | |
| 5,251,018 A | 10/1993 | Jang et al. | |
| 5,325,126 A | 6/1994 | Keith | |
| 5,339,164 A | 8/1994 | Lim | |
| 5,418,952 A | 5/1995 | Morley et al. | |
| 5,430,848 A | 7/1995 | Waggener | |
| 5,465,118 A | 11/1995 | Hancock et al. | |
| 5,497,434 A | 3/1996 | Wilson | |
| 5,519,874 A | 5/1996 | Yamagishi et al. | |
| 5,526,024 A | 6/1996 | Gaglianello et al. | |
| 5,566,339 A | 10/1996 | Perholtz et al. | |
| 5,572,235 A | 11/1996 | Mical et al. | |
| 5,630,036 A | 5/1997 | Sonohara et al. | |
| 5,659,707 A | 8/1997 | Wang et al. | |
| 5,664,029 A | 9/1997 | Callahan et al. | |
| 5,664,223 A | 9/1997 | Bender et al. | |
| 5,721,842 A | 2/1998 | Beasley et al. | |
| 5,731,706 A | 3/1998 | Koeman et al. | |
| 5,732,212 A | 3/1998 | Perholtz et al. | |
| 5,754,836 A | 5/1998 | Rehl | |
| 5,757,973 A | 5/1998 | Wilkinson et al. | |
| 5,764,479 A | 6/1998 | Crump et al. | |
| 5,764,924 A | 6/1998 | Hong | |
| 5,764,966 A | 6/1998 | Mote, Jr. | |
| 5,781,747 A | 7/1998 | Smith et al. | |
| 5,796,864 A | 8/1998 | Callahan | |
| 5,799,207 A | 8/1998 | Wang et al. | |
| 5,805,735 A | 9/1998 | Chen et al. | |
| 5,812,169 A | 9/1998 | Tai et al. | |
| 5,812,534 A | 9/1998 | Davis et al. | |
| 5,828,848 A | 10/1998 | MacCormack et al. | |
| 5,844,940 A | 12/1998 | Goodson et al. | |
| 5,861,764 A | 1/1999 | Singer et al. | |
| 5,864,681 A * | 1/1999 | Proctor et al. | 709/247 |
| 5,867,167 A | 2/1999 | Deering | |
| 5,870,429 A | 2/1999 | Moran et al. | |
| 5,898,861 A | 4/1999 | Emerson et al. | |
| 5,946,451 A | 8/1999 | Soker | |
| 5,948,092 A | 9/1999 | Crump et al. | |
| 5,967,853 A | 10/1999 | Hashim | |
| 5,968,132 A | 10/1999 | Tokunaga et al. | |
| 5,997,358 A | 12/1999 | Adriaenssens et al. | |
| 6,003,105 A | 12/1999 | Vicard et al. | |
| 6,008,847 A | 12/1999 | Bauchspies | |
| 6,012,101 A | 1/2000 | Heller et al. | |
| 6,016,316 A | 1/2000 | Moura et al. | |
| 6,032,261 A | 2/2000 | Hulyalkar | |
| 6,038,346 A | 3/2000 | Ratnakar | |
| 6,040,864 A | 3/2000 | Etoh | |
| 6,055,597 A | 4/2000 | Houg | |
| 6,060,890 A | 5/2000 | Tsinker | |
| 6,065,073 A | 5/2000 | Booth | |
| 6,070,214 A | 5/2000 | Ahern | |
| 6,084,638 A | 7/2000 | Hare et al. | |
| 6,094,453 A | 7/2000 | Gosselin et al. | |
| 6,097,368 A | 8/2000 | Zhu et al. | |
| 6,124,811 A | 9/2000 | Acharya et al. | |
| 6,134,613 A | 10/2000 | Stephenson et al. | |
| 6,146,158 A | 11/2000 | Peratoner et al. | |
| 6,154,492 A | 11/2000 | Araki et al. | |
| 6,195,391 B1 | 2/2001 | Hancock et al. | |
| 6,202,116 B1 | 3/2001 | Hewitt | |
| 6,233,226 B1 | 5/2001 | Gringeri et al. | |
| 6,240,481 B1 | 5/2001 | Suzuki | |
| 6,240,554 B1 | 5/2001 | Fenouil | |
| 6,243,496 B1 | 6/2001 | Wilkinson | |
| 6,304,895 B1 | 10/2001 | Schneider et al. | |
| 6,327,307 B1 | 12/2001 | Brailean et al. | |
| 6,345,323 B1 | 2/2002 | Beasley et al. | |
| 6,360,017 B1 | 3/2002 | Chiu et al. | |
| 6,370,191 B1 | 4/2002 | Mahant-Shetti et al. | |
| 6,373,890 B1 | 4/2002 | Freeman | |
| 6,377,313 B1 | 4/2002 | Yang et al. | |
| 6,377,640 B2 | 4/2002 | Trans | |
| 6,404,932 B1 | 6/2002 | Hata et al. | |
| 6,418,494 B1 | 7/2002 | Shatas et al. | |
| 6,425,033 B1 | 7/2002 | Conway et al. | |
| 6,453,120 B1 | 9/2002 | Takahashi et al. | |
| 6,470,050 B1 | 10/2002 | Ohtani et al. | |
| 6,496,601 B1 | 12/2002 | Migdal et al. | |
| 6,512,595 B1 | 1/2003 | Toda | |
| 6,516,371 B1 | 2/2003 | Lai et al. | |
| 6,522,365 B1 | 2/2003 | Levantovsky et al. | |
| 6,539,418 B2 | 3/2003 | Schneider et al. | |
| 6,542,631 B1 | 4/2003 | Ishikawa | |
| 6,567,464 B2 | 5/2003 | Hamdi | |
| 6,571,393 B1 | 5/2003 | Ko et al. | |
| 6,574,364 B1 | 6/2003 | Economidis et al. | |
| 6,584,155 B2 | 6/2003 | Takeda et al. | |
| 6,590,930 B1 | 7/2003 | Greiss | |
| 6,661,838 B2 | 12/2003 | Koga et al. | |
| 6,664,969 B1 | 12/2003 | Emerson et al. | |
| 6,701,380 B2 | 3/2004 | Schneider et al. | |
| 6,754,241 B1 | 6/2004 | Krishnamurthy et al. | |
| 6,785,424 B1 | 8/2004 | Sakamoto | |
| 6,829,301 B1 | 12/2004 | Tinker et al. | |
| 6,833,875 B1 | 12/2004 | Yang et al. | |
| 6,871,008 B1 | 3/2005 | Pintz et al. | |
| 6,898,313 B2 | 5/2005 | Li et al. | |
| 6,940,900 B2 | 9/2005 | Takamizawa | |
| 6,972,786 B1 | 12/2005 | Ludwig | |
| 7,006,700 B2 | 2/2006 | Gilgen | |
| 7,013,255 B1 | 3/2006 | Smith, II | |
| 7,020,732 B2 | 3/2006 | Shatas et al. | |
| 7,031,385 B1 | 4/2006 | Inoue et al. | |
| 7,085,319 B2 | 8/2006 | Prakash et al. | |
| 7,093,008 B2 | 8/2006 | Agerholm et al. | |
| 7,143,432 B1 | 11/2006 | Brooks et al. | |
| 7,221,389 B2 | 5/2007 | Ahern et al. | |
| 7,222,306 B2 | 5/2007 | Kaasila et al. | |
| 7,272,180 B2 * | 9/2007 | Dambrackas | 375/240.01 |
| 7,277,104 B2 | 10/2007 | Dickens et al. | |
| 7,321,623 B2 | 1/2008 | Dambrackas | |
| 7,336,839 B2 | 2/2008 | Gilgen | |
| 7,373,008 B2 | 5/2008 | Clouthier et al. | |
| 7,457,461 B2 | 11/2008 | Gilgen | |
| 7,466,713 B2 | 12/2008 | Saito | |
| 7,515,632 B2 | 4/2009 | Dambrackas | |
| 7,515,633 B2 | 4/2009 | Dambrackas | |
| 7,542,509 B2 | 6/2009 | Dambrackas | |
| 7,609,721 B2 | 10/2009 | Rao et al. | |
| 7,720,146 B2 | 5/2010 | Dambrackas | |
| 7,782,961 B2 | 8/2010 | Shelton et al. | |
| 7,941,634 B2 | 5/2011 | Georgi et al. | |
| 2001/0048667 A1 | 12/2001 | Hamdi | |
| 2003/0005186 A1 | 1/2003 | Gough | |
| 2003/0048943 A1 | 3/2003 | Ishikawa | |
| 2003/0202594 A1 | 10/2003 | Lainema | |
| 2003/0231204 A1 | 12/2003 | Haggie et al. | |
| 2004/0017514 A1 | 1/2004 | Dickens et al. | |
| 2004/0062305 A1 | 4/2004 | Dambrackas | |
| 2004/0064198 A1 | 4/2004 | Reynolds et al. | |
| 2004/0122931 A1 | 6/2004 | Rowland et al. | |
| 2004/0228526 A9 | 11/2004 | Lin et al. | |
| 2005/0005102 A1 * | 1/2005 | Meggitt et al. | 713/164 |
| 2005/0025248 A1 | 2/2005 | Johnson et al. | |
| 2005/0057777 A1 | 3/2005 | Doron | |
| 2005/0069034 A1 | 3/2005 | Dambrackas | |
| 2005/0089091 A1 | 4/2005 | Kim et al. | |
| 2005/0108582 A1 | 5/2005 | Fung | |
| 2005/0135480 A1 | 6/2005 | Li et al. | |
| 2005/0157799 A1 * | 7/2005 | Raman et al. | 375/240.27 |
| 2005/0198245 A1 | 9/2005 | Burgess et al. | |
| 2005/0231462 A1 | 10/2005 | Chen | |
| 2005/0249207 A1 | 11/2005 | Zodnik | |
| 2005/0286790 A1 | 12/2005 | Gilgen | |
| 2006/0039404 A1 | 2/2006 | Rao et al. | |
| 2006/0092271 A1 | 5/2006 | Banno et al. | |
| 2006/0120460 A1 | 6/2006 | Gilgen | |

| | | | |
|---|---|---|---|
| 2006/0126718 | A1 | 6/2006 | Dambrackas et al. |
| 2006/0126720 | A1 | 6/2006 | Dambrackas |
| 2006/0126721 | A1 | 6/2006 | Dambrackas |
| 2006/0126722 | A1 | 6/2006 | Dambrackas |
| 2006/0126723 | A1 | 6/2006 | Dambrackas |
| 2006/0161635 | A1 | 7/2006 | Lamkin et al. |
| 2006/0262226 | A1 | 11/2006 | Odryna et al. |
| 2007/0019743 | A1 | 1/2007 | Dambrackas et al. |
| 2007/0165035 | A1 | 7/2007 | Duluk et al. |
| 2007/0180407 | A1 | 8/2007 | Vahtola |
| 2007/0248159 | A1 | 10/2007 | Dambrackas |
| 2007/0253492 | A1 | 11/2007 | Shelton et al. |
| 2009/0290647 | A1 | 11/2009 | Shelton et al. |

FOREIGN PATENT DOCUMENTS

| | | |
|---|---|---|
| EP | 0780773 A1 | 6/1997 |
| EP | 0 844 567 | 5/1998 |
| EP | 0270896 | 6/1998 |
| EP | 0899959 | 3/1999 |
| GB | 2318956 | 6/1998 |
| GB | 2350039 | 11/2000 |
| GB | 2388504 | 11/2003 |
| JP | 64-077374 | 9/1987 |
| JP | 62-077935 | 10/1987 |
| JP | 63-108879 | 5/1988 |
| JP | 01-162480 | 6/1989 |
| JP | 01-303988 | 12/1989 |
| JP | H03-130767 | 4/1991 |
| JP | 3192457 | 8/1991 |
| JP | 6-77858 | 3/1994 |
| JP | H8-223579 | 2/1995 |
| JP | 08-033000 | 2/1996 |
| JP | 08-263262 | 10/1996 |
| JP | 09-233467 | 9/1997 |
| JP | 09-321672 | 12/1997 |
| JP | 11-308465 | 4/1998 |
| JP | 10-215379 | 8/1998 |
| JP | 10-257485 | 9/1998 |
| JP | 11-184800 | 7/1999 |
| JP | 11-184801 | 7/1999 |
| JP | 11-203457 | 7/1999 |
| JP | 11-308465 | 11/1999 |
| JP | 11-313213 | 11/1999 |
| JP | 2000-125111 | 4/2000 |
| JP | 2001-053620 | 2/2001 |
| JP | 2001-148849 | 5/2001 |
| JP | 2001-169287 | 6/2001 |
| JP | 2002-043950 | 2/2002 |
| JP | 2002-165105 | 6/2002 |
| JP | 2003-174565 | 6/2003 |
| JP | 2003-244448 | 8/2003 |
| JP | 2003-250053 | 9/2003 |
| JP | 2004-032698 | 1/2004 |
| JP | 2004-220160 | 8/2004 |
| TW | 589871 | 6/2004 |
| TW | I220036 | 8/2004 |
| WO | WO 97/41514 | 11/1997 |
| WO | WO 98/26603 | 6/1998 |
| WO | WO 98/54893 | 12/1998 |
| WO | WO 99/50819 | 10/1999 |
| WO | WO 01/22628 | 3/2001 |
| WO | WO 02/062050 A2 | 8/2002 |
| WO | WO 03/055094 | 7/2003 |
| WO | WO 03/071804 | 8/2003 |
| WO | WO 2004/032356 | 4/2004 |
| WO | WO 2004/081772 | 9/2004 |

OTHER PUBLICATIONS

Office Action Issued Jul. 11, 2006, in Corresponding Japanese Patent Application No. 2006-024444.
Office Action Issued Jul. 4, 2006, in Corresponding Japanese Patent Application No. 2006-024442.
Office Action Issued Jul. 4, 2006, in Corresponding Japanese Patent Application No. 2006-024443.
Office Action Issued Mar. 7, 2006, in Corresponding Japanese Patent Application No. 2004-541433.
Office Action Issued Mar. 7, 2006, in Corresponding Japanese Patent Application No. 2006-024442.
Office Action Issued Mar. 7, 2006, in Corresponding Japanese Patent Application No. 2006-024443.
Office Action Issued Mar. 7, 2006, in Corresponding Japanese Patent Application No. 2006-024444.
PCT International Search Report and Written Opinion mailed Jan. 3, 2006 in PCT/US05/17626, International filing Jan. 3, 2006.
PCT International Search Report and Written Opinion mailed Oct. 25, 2005 in PCT/US05/19256, International filing Oct. 25, 2005.
PCT International Search Report for PCT/US03/10488, International filing Jul. 28, 2003.
PCT International Search Report in corresponding PCT Application No. PCT/US2003/030650 mailed Apr. 20, 2006.
CN Appln. No. 200710167085.2—Dec. 27, 2010 SIPO Office Action translation.
JP 2007-518071—Feb. 8, 2011 JIPO Office Action.
JP Appln. No. 2007-518086—Feb. 15, 2011 JPO Office Action.
JP Appln. No. 2005-510478—Jul. 6, 2010 Decision of Rejection (English translation).
CA Appln. No. 2,524,001—Aug. 30, 2010 CIPO Office Action.
CA Appln. No. 2,627,037—Sep. 9, 2010 CIPO Office Action.
CN Appln. No. 200710167085.2—Aug. 6, 2010 SIPO Office Action.
JP Appln. No. 2007-098267—Jul. 27, 2010 JPO Notice of Reasons for Rejection with translation.
Office Action issued Jul. 31, 2007 in corresponding Japanese Patent Application No. 2006-024444 (with English translation).
U.S. Appl. No. 10/260,534, filed Oct. 1, 2002, Dambrackas.
U.S. Appl. No. 10/434,339, filed May 9, 2003, Dambrackas.
U.S. Appl. No. 10/629,855, filed Jul. 30, 2003, Johnson et al.
U.S. Appl. No. 10/875,678, filed Jun. 25, 2004, Gilgen.
U.S. Appl. No. 10/875,679, filed Jun. 25, 2004, Gilgen.
U.S. Appl. No. 11/282,688, filed Nov. 21, 2005, Dambrackas et al.
U.S. Appl. No. 11/339,537, filed Jan. 26, 2006, Dambrackas.
U.S. Appl. No. 11/339,541, filed Jan. 26, 2006, Dambrackas.
U.S. Appl. No. 11/339,542, filed Jan. 26, 2006, Dambrackas.
U.S. Appl. No. 11/340,476, filed Jan. 27, 2006, Dambrackas.
U.S. Appl. No. 11/528,569, filed Sep. 28, 2006, Dambrackas et al.
U.S. Appl. No. 11/707,863, filed Feb. 20, 2007, Hickey et al.
U.S. Appl. No. 11/707,879, filed Feb. 20, 2007, Hickey et al.
U.S. Appl. No. 11/707,880, filed Feb. 20, 2007, Hickey et al.
U.S. Appl. No. 11/819,047, filed Jun. 25, 2007, Dambrackas.
U.S. Appl. No. 11/889,268, filed Aug. 10, 2007, Hickey et al.
U.S. Appl. No. 60/774,186, filed Feb. 17, 2006, Hickey.
U.S. Appl. No. 60/795,577, filed Apr. 28, 2006, Shelton, Gary.
U.S. Appl. No. 60/836,649, filed Aug. 10, 2006, Hickey.
U.S. Appl. No. 60/836,930, filed Aug. 11, 2006, Hickey.
U.S. Appl. No. 60/848,488, filed Sep. 29, 2006, Hickey.
"Avocent Install and Discovery Protocol Specification," Version 1.3, Avocent Corporation Jul. 9, 2003 [30 pages].
"Avocent Secure Management Protocol Specification," Version 1.8, Avocent Corporation Apr. 8, 2005 [64 pages].
CA Appln. No. 2,382,403—Dec. 8, 2009 CIPO Office Action.
CA Appln. No. 2,476,102—Apr. 16, 2009 CIPO Office Action.
CA Appln. No. 2,676,794—Feb. 12, 2010 CIPO Office Action.
Digital Semiconductor 21152 PCI-TO-PCI Bridge, Data Sheet, Feb. 1996, Digital Equipment Corporation, Maynard, Mass.
Duff et al. (ed.) "Xilinx Breaks One Million-Gate Barrier with Delivery of New Virtex Series", Press Kit, Xilinx, Oct. 1998.
EP Appln. No. 03818864.5—May 8, 2009 EPO Office Action.
EP Appln. No. 05756603.6—Nov. 23, 2010 EPO Supplementary Search Report.
European Office Action in European application 99960160.2, dated Mar. 16, 2006.
European Office Action in European Application No. 99960160.2-2212 dated Nov. 15, 2006.
Hill, T. "Virtex Design Methodology Using Leonardo Spectrum 1999.1", Applications Note, Exemplar Logic Technical Marketing, Apr. 1999, Rev. 3.0, pp. 1-47.
Hsieh et al "Architectural Power Optimization by Bus Splitting", Design, Automation and Test in Europe Conference and Exhibition 2000. Proceedings, pp. 612-616.
IBM Tech. Disc. Bull. "Procedure and Design to Facilitate", Apr. 1994, vol. 37, Issue 4B, pp. 215-216.

IBM Technical Disclosure Bulletin, "Multimedia System Packaging", Sep. 1993, vol. 36, Issue 9A, pp. 525-530.
IL Appln. No. 184058—Jul. 14, 2010 Ministry of Justice Commissioner of Patents Office Action with translation.
International Preliminary Examination Report in PCT application PCT/US2003/04707, mailed Oct 1, 2004.
International Search Report and Written Opinion mailed Aug. 1, 2008 in PCT Application PCT/US05/46352.
International Search Report and Written Opinion mailed Jul. 29, 2008 in PCT Application PCT/US07/17700.
International Search Report relating to PCT/US03/04707 dated Jul. 11, 2003.
International Search Report, PCT/US99/25290 mailed Feb. 10, 2000.
International Search Report, PCT/US99/25291 mailed Feb. 7, 2000.
JP Appln. No. 2003-570573—Jul. 21, 2009 Office Action with English translation.
McCloghrie, K., "Management Information Base for Network Management of TCP/IP-based internets: MIB II," Network Working Group, Performance Systems International, (RFC 1213) Mar. 1991 [70 pages].
Mobility Electronics, Inc. Brochure for PCI Split Bridge, Scottsdale, AZ, 1999.
MY Appln. No. PI20030508—Mar. 6, 2007 MYIPO Substantive Examination Adverse Report.
MY Appln. No. PI20056038—Sep. 11, 2009 MyIPO Substantive Examination Adverse Report.
MY Appln. No. PI20056038—Aug. 30, 2010 MyIPO Substantive Examination Adverse Report.
MY Appln. No. PI20062195—Sep. 11, 2009 MYIPO Adverse Examination Report.
Official Action mailed Feb. 6, 2008 in Japanese Application No. 2003-570573 [with English translation].
PCI Local Bus Specification, Revision 2.1, Jun. 1995, The PCI Special Interest Group, Portland, Oregon.
PCT Written Opinion in PCT application PCT/US2003/04707, mailed Mar. 4, 2004.
Schutti et al. "Data Transfer between Asynchronous Clock Domains without Pain", RIIC, SNUG Europe 2000, Rev. 1.1, Feb. 2000, pp. 1-12.
Search Report and Written Opinion mailed Jul. 16, 2008 in PCT Appln. No. PCT/US2007/17699.
Supplementary European Search Report dated Aug. 9, 2010 in EP Appln. No. 03709132.9.
U.S. Appl. No. 11/303,031—Apr. 29, 2009 PTO Office Action.
U.S. Appl. No. 12/533,073—Mar. 9, 2011 PTO Office Action.
CA Appln. No. 2,524,001—Nov. 30, 2009 CIPO Office Action.
IL Appln. No. 167787—Jul. 21, 2009 Office Action.
JP Appln. No. 2005-510478—Jul. 7, 2009 Notice of Reasons for Rejection [English translation].
JP Appln. No. 2006-271932—Oct. 6, 2009 Office Action with English summary.
U.S. Appl. No. 11/790,994—Feb. 2, 2010 PTO Office Action.
EP Appln. No. 05756603.6—Apr. 7, 2011 EPO Office Action.
European Office Action in EP Appln. No. 057566036, dated Apr. 7, 2011 [6 pages].
U.S. Appl. No. 11/282,688—Apr. 28, 2010 PTO Office Action.
Chrysafis et al., "Line-Based, Reduced Memory, Wavelet Image Compression," Mar. 2000 [retrieved on Aug. 8, 2008], Retrieved from the internet: <http://sipi.usc.edu/~ortega/Students/chrysafi/doc/ChristosChrysafis_line_based_I_P2000.pdf>.
IL Appln. No. 171878—Apr. 28, 2009 Translation of Office Action.
International Search Report and Written Opinion mailed Sep. 4, 2008 in PCT/US07/10376.
Matsui et al., "High-speed Transmission of Sequential Freeze-pictures by Exchanging Changed Areas", IEEE Transactions on Communications, IEEE Service Center, Piscataway, NJ, vol. COM-29, No. 12, Dec. 1, 1981, XP002089584, ISSN: 0090-6778.
Official Action issued Dec. 9, 2008 in JP Appln. No. 2005-510478 [with English translation].
Search Report and Written Opinion mailed Aug. 26, 2008 in PCT Appln. No. PCT/US2006/021182.
Thyagarajan K. S. et al., "Image Sequence Coding Using Interframe VDPCM and Motion Compensation", ICASSP, IEEE International Conference on Acoustics, Speech and Signal Processing-proceedings 1989 Publ. by IEEE, vol. 3, 1989, pp. 1858-1861, XP010082957.
U.S. Appl. No. 11/339,537—Mar. 13, 2009 PTO Office Action.
U.S. Appl. No. 11/790,994—Jun. 2, 2009 PTO Office Action.
Office Action Issued Aug. 5, 2008 in Corresponding Japanese Patent Application No. 2006-271932.
Chinese Appln. No. 03816346.2—Jun. 12, 2009 SIPO Office Action (Translation).
EP Appln. No. 03818864.5—Aug. 24, 2009 EPO Office Action.
U.S. Appl. No. 11/819,047—Aug. 26, 2009 PTO Office Action.
International Search Report and Written Opinion mailed Sep. 14, 2010 in PCT Appln. No. PCT/US2010/001941.
CN Appln. No. 200710167085.2—Jun. 26, 2009 SIPO Office Action.
U.S. Appl. No. 12/318,074—Sep. 14, 2009 PTO Office Action.
U.S. Appl. No. 11/707,879—Nov. 28, 2011 PTO Office Action.
U.S. Appl. No. 12/458,818—Nov. 22, 2011 PTO Office Action.
CA Appln. No. 2,625,658—Oct. 12, 2011 CIPO Office Action.
JP Appln. No. 2007-098267—Oct. 11, 2011 JPO Final Notice of Reasons for Rejection.
Chinese Appln. No. 03816346.2—Jul. 6, 2011 SIPO Office Action (Translation).
CN Appln. No. 200710167085.2—Aug. 2, 2011 SIPO Office Action (with English Translation).
EP Appln. No. 03723915—Aug. 1, 2011 EPO Supplementary European Search Report.
EP Appln. No. 07776613—Jul. 25, 2011 EPO Supplementary European Search Report.
JP Appln. No. 2007-518071—Sep. 6, 2011 Decision of Rejection with statement of relevancy.
U.S. Appl. No. 12/801,293—Aug. 15, 2011 PTO Office Action.
CA Appln. No. 2,630,532—Jul. 25, 2011 CIPO Office Action.
U.S. Appl. No. 12/533,073—May 23, 2011 PTO Office Action.
JP Appln. No. 2007-518086—Jun. 21, 2011 JIPO Office Action.
CN Appln. No. 03816346.2—Nov. 23, 2011 Office Action (with English translation).
CA Appln. No. 2,650,663—Feb. 1, 2012 CIPO Office Action.
CA Appln. No. 2,625,462—Feb. 5, 2012 CIPO Office Action.
EP Appln. No. 05756603.6—Dec. 13, 2011 EP Office Action.
IL191529—Dec. 4, 2011 Ministry of Justice Commissioner of Patents Office Action with translation.
U.S. Appl. No. 12/458,818—Jan. 26, 212 PTO Office Action.
"Lossless and Near-Lossless Coding of Continuous Tone Still Images (JPEG-LS)", ISO/IEC JTC1/SC29/WG1 FCD 14495—Public Draft, XX, XX Jul. 16, 1997, pages I-IV,1, XP002260316, Retrieved from the Internet: URL:http://www.jpeg.org/public/fcd14495p.pdf paragraphs [04.2], [04.4], [A.
CN Appln. No. 200910223192.1—May 10, 2012 SIPO Office Action with English translation.
EP Appln. No. 05754824.0—Jul. 6, 2012 EPO Supplementary Search Report.
Kyeong Ho Yang et al: "A contex-based predictive coder for lossless and near-lossless compression of video", Image Processing, 2000. Proceedings. 2000 International Conference on Sep. 10-13, 2000, IEEE, Piscataway, NJ, USA, vol. 1, Sep. 10, 2000 pp. 144-1.
CA Appln. No. 2,571,478—Jan. 31, 2012 CIPO Office Action.
CA Appln. No. 2,625,658—Jun. 4, 2012 CIPO Office Action.
CA Appln. No. 2,630,532—Mar. 20, 2012 CIPO Office Action.
CN Appln. No. 200910223192.1—May 10, 2010 Office Action.
Extended European Search Report mailed Feb. 14, 2012 in EPO Appln. No. 05854984.1.
Official Letter mailed Mar. 16, 2012 in TW 94117242.
U.S. Appl. No. 11/889,525—Feb. 15, 2012 PTO Office Action.
Cagnazzo, Marco et al., "Low-Complexity Scalable Video Coding through Table Lookup VQ and Index Coding," IDMS/PROMS 2002, LNCS 2515, pp. 166-175, 2002.
EP Appln. No. 05754824.0—Sep. 14, 2012 EPO Office Action.
EP Appln. No. 06849789.0—Oct. 23, 2012 Supplementary European Search Report.
Goldberg, Morris et al., "Image Sequence Coding Using Vector Quantization," IEEE Transactions on Communications., vol. COM-34, No. 7, Jul. 1986.
MY Appln. No. PI20084298—Aug. 30, 2012 MyIPO Substantive Examination Adverse Report.

Official Letter mailed Sep. 17, 2012 in TW Appln. No. 95120039.

TW Appln. No. 94145077—May 17, 2012 Taiwanese Patent Office Official Letter.

Bowling, Carl D. et al., "Motion Compensated Image Coding with a Combined Maximum A Posteriori and Regression Algorithm," IEEE Transactions on Communications, New York, USA, vol. COM-33, No. 8, Aug. 1, 1985, pp. 844-857.

EP Appln. No. 03818864.5—Sep. 20, 2012 EPO Office Action.

Puri, A. et al., "Motion-compensated transform coding based on block motion-tracking algorithm," International Conferences on Communications 1987, IEEE, pp. 136-140.

\* cited by examiner

VIDEO COMPRESSION ENCODER

This is a continuation-in-part of U.S. patent application Ser. No. 10/260,534 to Dambrackas, entitled "Video Compression System," filed Oct. 1, 2002 (Dambrackas Video Compression). This case is related to U.S. patent application Ser. No. 11/282,688, entitled Video Compression Encoder, filed on Nov. 21, 2005, publication number US-2006-0126718-A1.

FIELD OF THE INVENTION

This relates generally to digital video compression systems.

INTRODUCTION

In the commonly-owned patent application Ser. No. 10/260,534 ('534 application), published as US Publication No. US2005-0069034 one common inventor described a new technology for encoding digital video that exhibited particular success in the computer video arts. The contents of that publication will be presumed to be of knowledge to the reader, and are incorporated herein by reference.

In the typical computer video scenario, digital pixel information is prepared by a server 7 (FIG. 1) employing a local processor (video or CPU) 5 to coordinate the preparation of the video for a local-running application, and usually a frame buffer 6 to temporarily store the pixel signals for each pixel value on a current video screen (and sometimes some number of former video screens too). The frame buffer 6 may or may not be a memory element separate from the processor 5. The details of the preparation of digital video signals are not necessary for a full understanding of the present inventions, so a generic description of source video 10 (with or without known kinds of pre-processing, packeting, or conditioning) being provided to the video compressor 17 suffices. The source video 10 is usually, though not necessarily, serial and digital.

The video compressor 17 can be a local hardware component near or in the server 7 (anywhere, such as on a daughter card, a hang-off device, an external dongle, on the motherboard, etc.), a software component (anywhere, such as in a local CPU, a video processor, loaded in the motherboard, etc.), or an external pod communicating with the server via a communication link, network, wireless, or other coupling protocol.

Inside the video compressor 17, one of the frame buffers 11 and 12 receives the serial pixels from the source video 10 and loads them into the frame buffer to (typically) mimic the local frame buffer 6. A switch ahead of the frame buffers 11 and 12 loads a current (or "new") frame into one of the frame buffers 11 or 12 while the other of the frame buffers 11 or 12 retains the previous (or "old") frame that the switch had just previously directed to it. In that way, at any given time, one of the frame buffers 11/12 retains a complete old frame and the other of the frame buffers 11/12 is being fed a new frame. The frame buffers then alternative, frame-by-frame, storing/loading the old/new frames.

The old and new frames are used by the video compressor 17 to determine relationships between pixels in the current frame compared to the previous frame. An encoder 13 within the video compressor 17 determines those relationships between the pixels in the current frame (drawn from the new frame buffer 11/12) and pixels in the prior frame (drawn from the old frame buffer 11/12). The encoder 13 may also determine relationships between pixels each located with the current frame. In each case, the relationships can include run-length relationships or series relationships.

Run-length relationships identify runs of pixels in the serial pixel stream (from the source video 10) that have pixel values related to already known pixel values. By identifying the relationship, the decoder is instructed to "copy" the known pixel(s) for the identified run-length, rather than writing the independently identified pixel values. The run-length relationships can include any relationship determined between pixels of the current frame or between pixels of the current and previous frames. They may include the so-called (1) "copy old," (2) "copy left," (3) "copy above," or other locational relationship commands. The "copy old" (CO) command is particularly appropriate for the present disclosure. In it, the pixel values for pixel locations in the current run-length of the current frame are determined to be the same as those pixel values of the previous frame in the same pixel locations. The CO command simply tells the decoder copy the same pixels for a run of X number of pixels that are identical to the pixels in the same run location of the previous frame. Similarly, the "copy left" (CL) command and "copy above" (CA) command indicate that the present run of pixels are the same as the pixels on the left of the current pixels (in the case of the CL command), or the pixels are the same as the pixels above the current pixels (in the case of the CA command). Of course, other kinds of locational relationships (other can "old," "left," and "above") can be and are envisioned as well.

In the preferred run-length cases, the format for the encoding can include (using eight bit bytes by way of example only):

(1) For a first byte in the encoding, the byte can begin with a number of first bits identifying a code indicative of the run-length type (CO, CL, CA, etc.) followed by a remaining number of bits identifying the run length itself. For example, an eight bit byte can employ the first three bits for code indication followed by the next five bits indicating in a binary word the run length (up to a $2^5$ pixel run length).

(2) Another following byte of encoding if the run length exceeds $2^5$ pixels, where the first bit is a code indicating that the byte continues the previous run, followed by seven more bits in the binary word (which when strung with the previous 5 bits of the previous word will make a 12 bit word indicative of up to a $2^{12}$ pixel run length).

(3) A number of additional following bytes like those in (2) where the run length exceeds the $2^n$ pixel run length of the string of previous bits.

"Series" commands are a little different from the run-length commands and can contribute remarkable efficiency to the video compression. They are described in more detail in the '534 application, so only a brief description will be provided here. In essence, the series commands instruct the decoder to write a run of pixels using just two prior-known colors. In the preferred series cases, the format for the encoding can include (using eight bit bytes by way of example only):

(1) For a first byte in the encoding, the byte can begin with a number of first bits identifying a code indicative of the series command. When the encoder reads that command, it preferably employs the immediately previous two pixels colors (i.e., the two colors to the immediate left of the beginning of the current run) as the two known colors for writing the coming run. The bits in the encoding byte following the series command code indicate which of the two colors should be written for each of the coming pixels, with a "0" being indicative of the first color and a "1" being indicative of the second color.

Thus, a byte of "command" followed by 00101 would mean write a pixel of the "0" color (i.e, the first of the known colors), followed by another "0" color, followed by a "1" color (i.e., the second of the known colors), followed by another "0" color, followed by another "1" color.

(2) Another following byte of encoding if the series length exceeds five pixels, where the first bit is a code indicating that the byte continues the previous series, followed by seven more bits each indicating which of the two colors should be written for the next seven pixels.

(3) A number of additional following bytes like those in (2) where the series length exceeds the 12 pixels.

If neither run-length nor series encoding is available or plausible, then the encoder will resort to higher overhead single-pixel color commands (usually requiring three bytes per pixel color for five bit color, and more for higher quality color) to instruct the decoder on a particular pixel value.

As shown in FIG. 1, the video compressor 17 includes two relevant hardware components: a frame buffer chip 16 and a processor such as an FPGA 14. Alternatives to those are well-known and contemplated herein but solely for the purpose of this description, they will be referred to as a frame buffer chip 16 and an FPGA 14. A typical FPGA will be programmed to incorporate the encoder 13 that encodes the video according to the above descriptions. It will also include a local buffer 15 of some limited size that is used for buffering information during FPGA processing. The additional frame buffer chip 16 is used because the local buffer 15 is typically not large enough to store even one frame of pixel information.

The video compressor 17 communicates with a client 19, typically by a network connection via a standard network interface (not shown) such as an Ethernet or other suitable network communication system. Of course, the video compressor 17 and client 19 could also communicate by other communication means such as a hard wire, wireless, etc. The system of FIG. 1 is not meant to be limited to a particular inter-entity communication methodology.

At the client 19, the decoder 18 is usually an application or script function in the local processing system 21 already in the client 19. If the client 19 is a computer workstation, for example, the decoder 18 is an application that runs on the local CPU employing some local memory 22. Also, client 19 usually contains a frame buffer 20 (sometimes on a separate video processing board) that receives the pixel information for a frame from the decoder 18. In practice, the objective is to move the information from the frame buffer 6 in the server 7 to the frame buffer 20 in the client 19 through the frame buffers 11/12 in the video compressor 17. In the midst, the video compressor reduces the size of the frame of information by the run-length, series, and pixel encoding and the decoder 18 restores the size of the frame by decoding it.

Presently, the cost of the frame buffer chip 16 is driving the cost of the video compressor 17. As the price of FPGAs for FPGA chip 14 (or alternatively ASICs, etc.) is falling, the price of the frame buffer chip has come to dominate the parts cost. We have developed a way to eliminate the frame buffer chip 16 without altering the kinds of encoding commands used and thus advantageously not altering the decoder function 18 in any way.

Instead of storing all pixels in a video frame buffer, the disclosed encoder stores check values for groups of pixels and the minimum number of pixels necessary to execute the implemented commands. Grouping of pixels can be done in any fashion, for example; a group can be all pixels on a single video line, a portion of a line, multiple lines or screen rectangles containing portions of multiple lines. For purposes of example only, the embodiment described below defines all pixels on each single video line as a group of pixels, therefore a video screen of 1024 by 768 pixels would have 1024 groups of pixels and 1024 check values stored in memory.

In order to take advantage of the "copy old" commands we must have a reference to a previous frame. Using a 16 bit CRC calculation for each line allows us to use the "copy old" command on a line by line basis. For 1024 lines, it requires 1024 CRC values taking up 2048 bytes of memory that will still fit inside today's FPGAs.

In order not to have a large storage space for a frame's worth of compressed data we can compress different lines of pixel data over multiple video frames. We can compress lines only as fast as it can be sent across the network. This can be done by having a small compressor buffer, for example 4 k bytes. If there is enough buffer space in the compressor to compress the worst case line (all make pixels), then the line of video is compressed (using the make pixel, make series, copy left, copy above command, and copy old command with a matching CRC) and placed in the compressor buffer, otherwise, the compressor compresses the line using the "copy old" command which will only take a few bytes of data for the entire line. In other words, in the later case the line is simply held over from a previous frame until the network can accommodate new video compression. If a line does not get compressed on this frame, then the corresponding line will either get compressed on the following frames and the user experience will be satisfactory.

While the encoder encodes the first line of the frame, it also computes a check value from all the incoming pixels on that line and stores the check value for that line in the local buffer 15 of the FPGA. The check value can be computed from the incoming pixels before or after the pixels are encoded. It then sends the encoding to the decoder 18, which decodes the information in its normal manner and loads the resultant pixel values for that line in the frame buffer 20, as usual. The encoder then continues with the next line of the frame until each line of the frame is encoded, a corresponding check value is stored in the local buffer 15, and the encoding is sent to the decoder 18.

When the first line of the next frame arrives, its check value is determined. If the check value is the same as the check value stored for the frame previously sent to the decoder, then the encoder encodes the line as a "copy old" command using the entire line as the run length. The stored check value remains the same in the local buffer 15 and will be used again for the same line when the next frame arrives. Subsequent lines in this frame that have the same check values as corresponding lines in previously sent frames will also be encoded completely as "copy old" and added to the run length in the previously started "copy old" command. The decoder, receiving the "copy old" command operates on it as it normally would: it copies the old pixels from the prior known frame for the entire line.

If the check value for a line is different from that stored in the local buffer 15, then the encoder overwrites the new check value for that line in the local buffer 15 and then sends the new encoded line to decoder 18. Decoder 18 again decodes the line as it normally would.

If the network throughput is insufficient for an encoded line to be sent, the encoder leaves the check value for that group unchanged and sends a command instructing the decoder not to change those pixels (even though they did change). This defers the updating of that line until the next frame. (This form of flow control would not be required if a frame buffer were used to hold all pixels from all lines until the network throughput was sufficient to resume sending).

The first line to be encoded following a line that had its updating deferred (as described above), can not use encoding commands that reference pixels in the deferred line. For example, the Copy Above (CA) command cannot be used for any of the line, the Copy Left (CL) command can not be used on the first pixel of the line, and the Make Series (MS) command can not be used anywhere on the line if it references a pixel on the deferred line. Other than these restrictions, all other encoding commands can be used.

As can been seen, the decoder 18 has no ability to realize when the encoder has chosen to encode the line based on the normal encoding procedure versus the mandated "copy old for a line run-length" procedure. It simply writes pixels as it's told by the same kinds of run-length, series, and pixel commands normally sent to it. The encoder sends the normal run-length, series, and pixel commands line-by-line unless it determines for a particular line that a check value is the same or network throughput is insufficient to send the encoded commands, in which case it mandates the "copy old for a line run-length" command.

In the end, the encoder no longer has to store entire frames of information, so the frame buffer chip can be eliminated. All of its encoding can be accomplished by receiving and encoding just a line or so at a time using just "copy left," "copy above," "make series," and "draw pixel" commands until the check value determination reveals that a "copy old" is appropriate. In that instance, the encoder does not even have to know (and could not find out anyway) what the "old" pixels were—only that whatever the decoder has stored as the "old" pixels are ones that it should copy. The encoder then stores only a line (or few lines), which is a small enough amount of data (compared to one or two entire frames, for example) that it can be stored in the local buffer 15 and the frame buffer chip can be eliminated from the video compressor.

BRIEF DESCRIPTION OF THE DRAWINGS

The present invention, in order to be easily understood and practiced, is set out in the following non-limiting examples shown in the accompanying drawings, in which.

DETAILED DESCRIPTION OF THE PREFERRED EMBODIMENT

Figure 1:
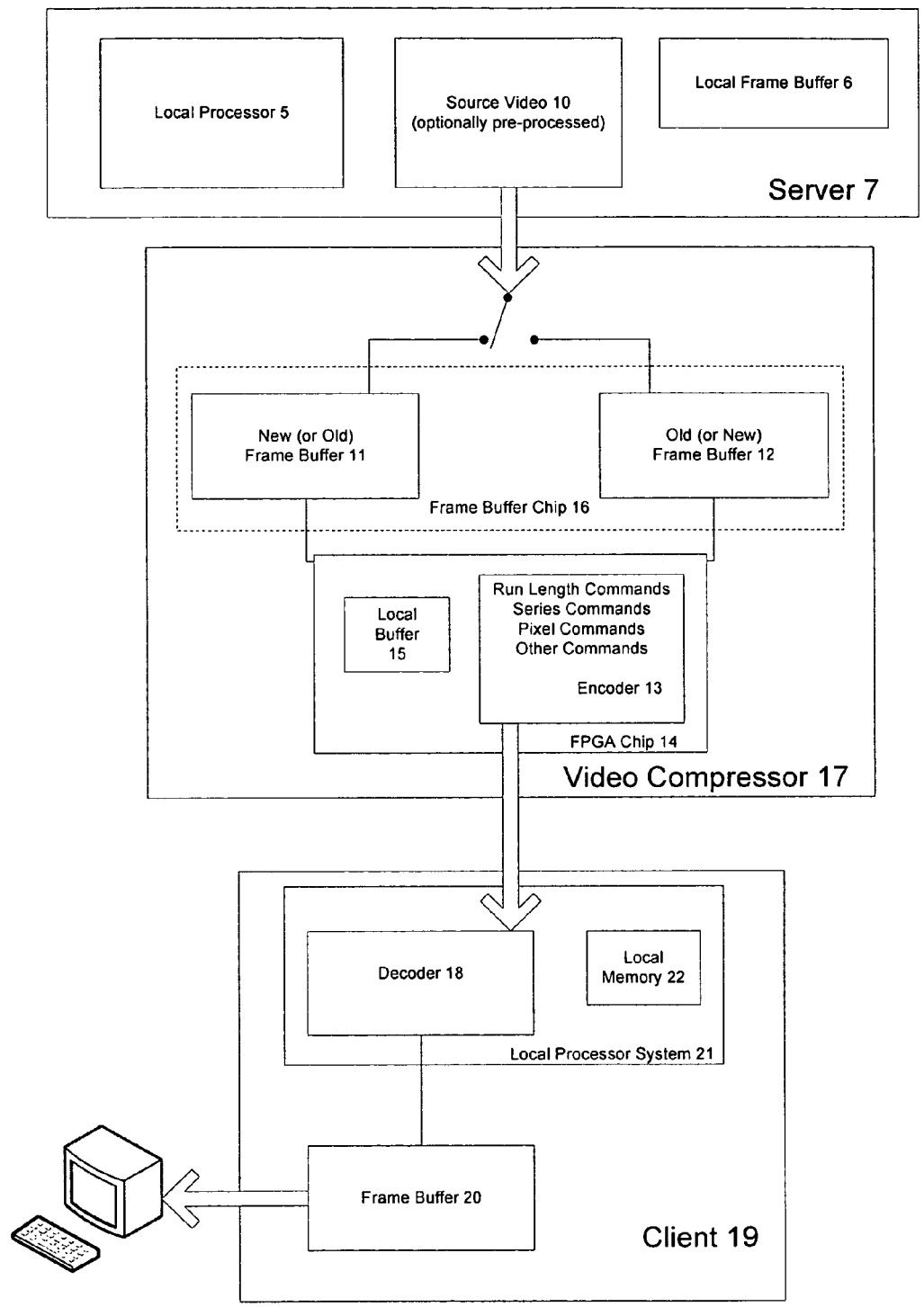
FIG. 1 is an example system employing a frame buffer in the video compressor.

Reference is made to FIGS. 1-9 in which identical reference numbers identify similar components.

In an example video compression system, a client 19 with a workstation monitor is expected to receive video signals for display on the monitor from a distant server 7. Video signals are notoriously high-volume signals. A single screen of video at a common resolution of 1024 by 768 can be around one million pixels. Each pixel has a defined color, and each color has a defined red component, blue component, and green component (other color schemes are also known and can be used, but the so-called RGB system will be used herein by way of illustration and not limitation). Each red, blue and green color component is defined by a numeric value written as a binary word, sometimes five bits long (providing $2^5=32$ possible color values for each red, green, and blue) but as long as the system can reasonably accommodate without limit. With five bit component values, a minimum of 15 bits are required to define each single pixel color, which are usually embodied in two eight-bit bytes. The one-million pixels for a video screen thus require two-million bytes to define the colors. A screen usually refreshes every $\frac{1}{60}^{th}$ of a second, so transportation of 120 megabytes per second would be required to deliver streaming video without compression. And, that assumes a relatively low 5-bit color scheme, where many users would prefer a higher quality of color composition. Some communication links may accommodate such large volumes of constantly streaming data—but not many—especially if there are multiple simultaneous users employing the same communication link.

To alleviate the video data volume, a video compressor 17 receives the video from a source video 10 and reduces it. Each frame of the video is alternatively loaded into a new/old frame buffer 11/12 where it is retained for use by the encoder 13 programmed into an FPGA chip 14. According to one example, the encoder 13 encodes the video by a hierarchical choice of run-length encoding, series encoding, or as a last resort individual pixel encoding. The run-length encoding essentially identifies a run of pixels the color of which can be identified on the basis of pixel colors that are already known. Thus, a CO command will instruct the decoder for a current pixel to copy the color of the pixel at the same pixel location as the current pixel but from the previous frame. A CA command will instruct the decoder for a current pixel to copy the color of the pixel immediately above the current pixel in the same frame. A CL command will instruct the decoder for a current pixel to copy the color of the pixel immediately to the left of the current pixel in the same frame. Assuming again, by way of example only, a five-bit color scheme in which each pixel would require three eight-bit bytes to identify its individual color, that same pixel may be identifiable as a Copy command in only a single byte. Further, if a continuous run of pixels can be identified as all comporting to a common command condition (such as each pixel in a run of 100 pixels is the same as their corresponding old, above or left pixels), then a code can be written to tell the decoder in a byte or two that a Copy command applies to a run of 100 pixels. In such a case, a run of 100 pixels that could require 300 bytes of coding to individually identify each pixel color could be accurately encoded with only a byte or two.

Example formats for copy encoding can be found in the '534 application. One such example is described below for purpose of convenience to the reader. In it, an eight-bit byte is assumed, although the encoding can be used in any byte size of any number of bits. For copy commands, each byte is in the format: CCCRRRRR, where the first three C-bits identify the command type according to the following key:

000=Copy Old Command
001=Copy Left Command
010=Copy Above Command

The next five R-bits identify the run length. If the current run is determined by the encoder 13 to be less than $2^5$ (i.e., 32 continuous pixels), then the five R-bits of one byte will encode the run length. If the run length is more than $2^5$ then a following eight-bit byte is encoded with the same three command bits followed by another five bits that are combined with the five bits of the preceding byte to make a ten-bit word accommodating a $2^{10}$ run length (i.e., 1024 continuous pixels). A third byte can be added to encode a run of $2^{15}$ run length (i.e., 32,768 continuous pixels) and a fourth byte can accommodate an entire screen as a continuous run of $2^{20}$ run length (i.e., 1,048,576 continuous pixels, which is more than the pixels in one full screen of 760×1024).

Thus, a continuous run amounting to an entire screen that would have taken around 120 million bytes to write the individual colors can be written in just four bytes of encoding.

The series command is used whenever a run of pixels of just two colors is found. In it, the two colors are first encoded using one of the copy of pixel-draw commands so the decoder knows the actual value of the two possible colors (in essence, the decoder knows that the two colors immediately preceding the series command are the two colors to be used in the series, with the first color assigned the "0" value and the second color assigned the "1" value). The first byte in the series bytes has the following format: CCCXDDD, where C is the command key identifying the series command, X is the multiple byte indicator, and the D-bits indicate which of the two possible colors the next three consecutive pixels are. In this case, the CCC key for the series command is 011 (a code unique compared to the copy command keys). The X bit is set to "0" if the run of two-color series is just three pixels (corresponding to the three D-bits) long, and to "1" if the next byte continues the two-color series. Each subsequent series byte then takes the form of: XDDDDDDD, where the X-bit again indicates whether the next byte continues the series (by indicating "1" until the last byte in the series is reached in which case it is set to "0" to indicate the next byte is the last one) and each D-bit again indicates the "0" or "1" color for the next seven pixels in the continuous series.

If neither a copy command nor a series command will effectively encode the next pixel(s), the encoder resorts to encoding the next pixel as a make pixel command. In this command, the pixel color is communicated using the traditional Red, Green, Blue color values. For five bit color, the two byte pixel command takes the form of: CRRRRRGG GGGBBBBB, where C is a key, for example "1," that identifies the make-pixel command (note that none of the other commands began with a "1"), RRRRR is five-bit red color value, GGGGG is the five-bit green color value, and BBBBB is the five-bit blue color value. The encoder 13 tries to encode pixels using other, more efficient encoding before it finally resorts to as few make-pixel encodings as possible and can return again to a copy or series command.

The above descriptions, especially with respect to the copy old command, require the video compressor 17 to store a previous frame as it receives the current frame from the source video 10 in order to compare the current pixel values with the pixel values in the same locations of the previous frame. Thus, FIG. 1 illustrates new and old frame buffers 11/12 in the frame buffer chip 16. With it, an FPGA chip 14 contains the encoder 13 and some smaller amount of local memory 15.

On the client side, a decoder 18 receives the copy, series and make-pixel commands and re-writes the pixel colors based on those commands into a frame buffer 20. The decoder 18 can be a script function or an application written in the existing local processor 21 of the client 19.

The video compressor 17 can be employed as a hang-on device to the server 7, or it can be included in server 7 as a daughter card, as a built-in to the video processor, as an embedded process in the mother board, or any other hardware or software accommodation. In any event, it is advantageous to reduce the cost of the components in the video compressor 17, including the frame buffer chip 16. The embodiment of FIG. 2 eliminates the frame buffer chip entirely.

To utilize copy commands in serial video encoding where pixel values are received only once in sequence (where pixels of a frame are received from the top left corner of the frame to the bottom right corner of a frame going from left-to-right/top-to-bottom) the pixels to be compared and all the pixels there between must be stored. Thus all copy commands can be thought of specifying the "distance" a reference pixel is from a pixel to be encoded. The memory requirements for each of the copy commands described above are as follows:

(1) To utilize the CO command, pixel values for one pixel plus the number of pixels in a frame need to be stored;
(2) To utilize the CA command, pixel values for one pixel plus the number of pixels in a line need to be stored;
(3) To utilize the CL command, pixel values for two pixels need to be stored;

Thus for copy pixel commands the memory required to utilize such commands is a function of the number of pixels between the pixels to be compared and the amount of data per pixel. Further, it should appreciated that it does not require any additional memory to implement a new copy command when another copy command is implemented for a pixel that is "further away" from the current pixel than the new reference pixel e.g. no additional pixels need to be stored to implement CA when CO is already implemented and no additional pixels need to be stored to implement CL when CA is already implemented.

More generally, the memory requirements described above can be applied to comparison encoding of groups of consecutive pixels. Where the memory requirements to implement a type of group encoding are a function of the number of groups between the groups to be compared and the amount of data per group. For example, if a copy command based on whether two corresponding lines are the same is to be implemented, values representing the lines need to be stored and values representing the lines there between need to be stored. Further, like copy pixel commands described above, no additional memory is required to implement a new copy command for a given type of group of pixels when another copy command for the given type of group is already implemented, provided the command that is already implemented compares a group that is located "further away" from the current group than the group that is to be implemented. For example, if a copy command is implemented that compares a current line of pixels to the corresponding line in the previous frame, no additional memory is required to implement a copy command that compares the current line of pixels to the line of pixels directly above it.

Typically, storing values representing a group of pixels requires less memory than storing a value for each pixel in the group, i.e. storing a 16 bit value representing a line requires less memory than storing a 16 bit value for each pixel in the line. Thus, when memory constraints do not allow a particular pixel that is "too far" from the current pixel to be compared with the current pixel, a compromise can be made, i.e. the particular pixel can be placed in a group of pixels and the group can be compared to the corresponding group comprising the present pixel. For example, when there is not enough memory to implement the traditional CO command (not enough memory to store a frame's worth of pixels) the pixel in the old frame can be grouped in a line and the line from the old frame can be compared to the current line. Further, copy pixel commands can still be implemented for pixels that are "closer" to the current pixel. Thus, memory can be optimized by choosing a combination of groups which comprise different number of pixels that are different "distances" from the current group. One way to optimize memory is to choose a set of groups where there are more pixels in the groups that are "further" from the current pixel and fewer pixels in the groups that are "closer" to the current pixel.

The following example is used to illustrate an example method of choosing groups to optimize memory. Suppose each pixel and groups of pixels can be represented by two bytes and a frame is 1024 lines by 768 pixels. To implement a CO command for pixels approximately 1.5 MB of data needs to be stored. To implement a CA command for pixels approximately 1.5 KB of data needs to be stored. To implement a copy old command for a line of pixels 2050 bytes need to be stored. Thus, to implement a CA command and a copy old command for a line approximately 3.5 KB of memory is required (2050 bytes for line values (1024+1)*2 and bytes for pixels 1538 bytes for pixel values (768+1)*2). Thus, if there is not enough memory implement the CO command for a pixel, the CA command can be implemented for pixels and a copy command can be implemented for lines. Further, if there is sufficient memory, pixels could be grouped into half lines instead of full lines.

It should be appreciated that when the first pixel of a group of pixels is the same as an individual pixel that was previously compared to the current pixel no modification needs to be made to the decoder. For example, the decoder is able to interpret a CO command for a line of pixels starting with the first pixel in the line encoded using the same header as the CO by simply specifying the number of pixels to do the CO command for a line of pixels. For example, the following encoding scheme could be implemented without modifying decoder 18. CO could be used to encode groups comprising half a line of pixels, CA could be used to encode groups of four consecutive pixels and CL could be used single pixels.

Figure 2:
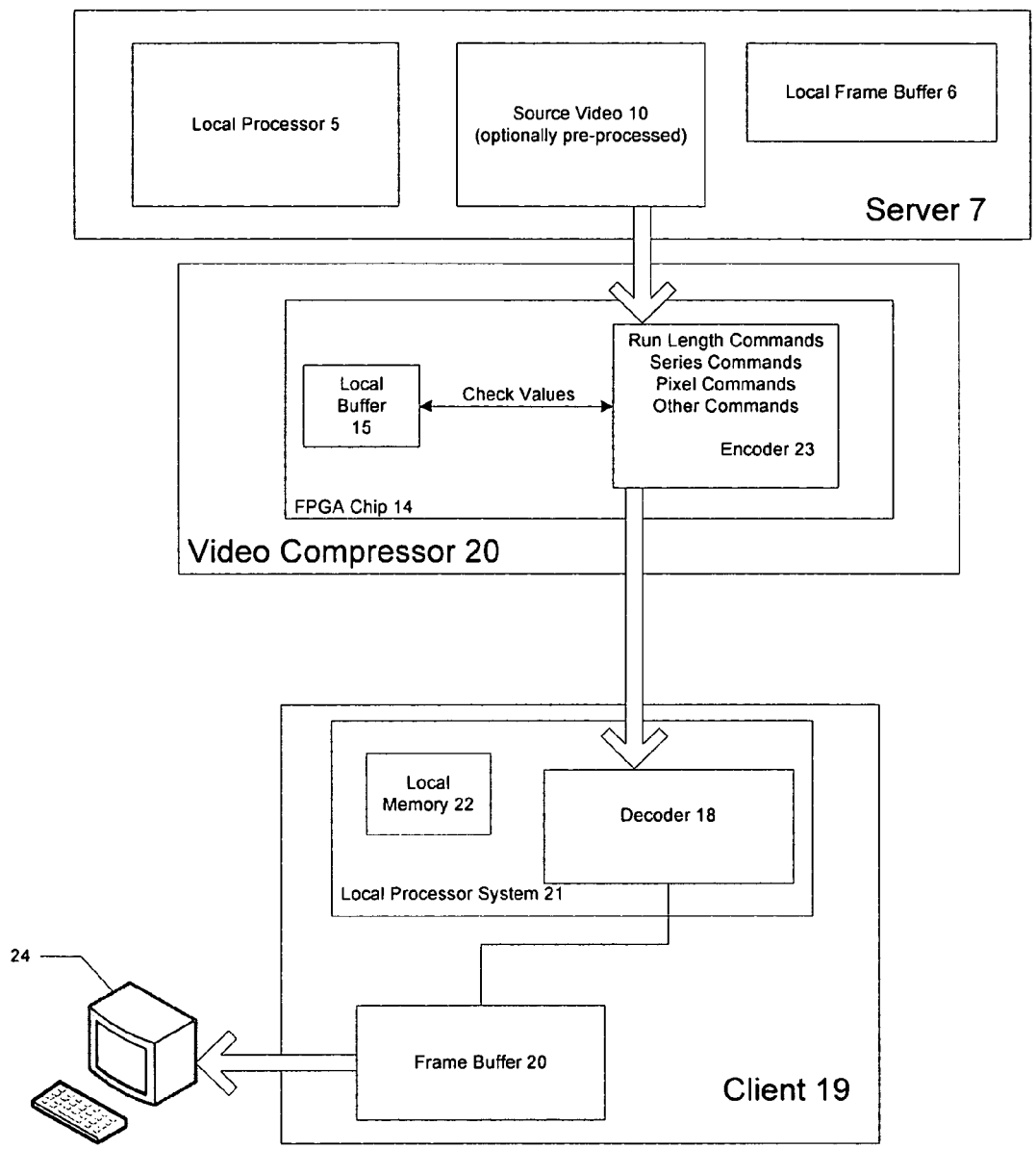
FIG. 2 is an example system eliminating the frame buffer from the video compressor.

In FIG. 2, the video compressor 20 is still fed the exact same source video as the video compressor 17 from FIG. 1. Video compressor 20, though, does not receive the video into a frame buffer, nor does it receive the video into a video switch. Rather, the video stream goes into the FPGA chip 14, where at most a couple of lines are stored in the local buffer 15 while the encoder 23 encodes the current line. By eliminating the frame buffers though, the encoder 23 no longer has the prior frame to use in determining the appropriateness of "copy old"-type commands. It accommodates that loss by storing a check value for each line and using that check value to presume "copy old"-type commands apply whenever the check values match for a given line between frames.

The decoder 18 operates the same as the decoder did with the frame buffers present. In other words, it does not know or care whether the coding commands were produced by standard encoding or by check value replacement encoding. It simply decodes the run-length, series, and pixel commands exactly as it would have done otherwise.

Figure 3:
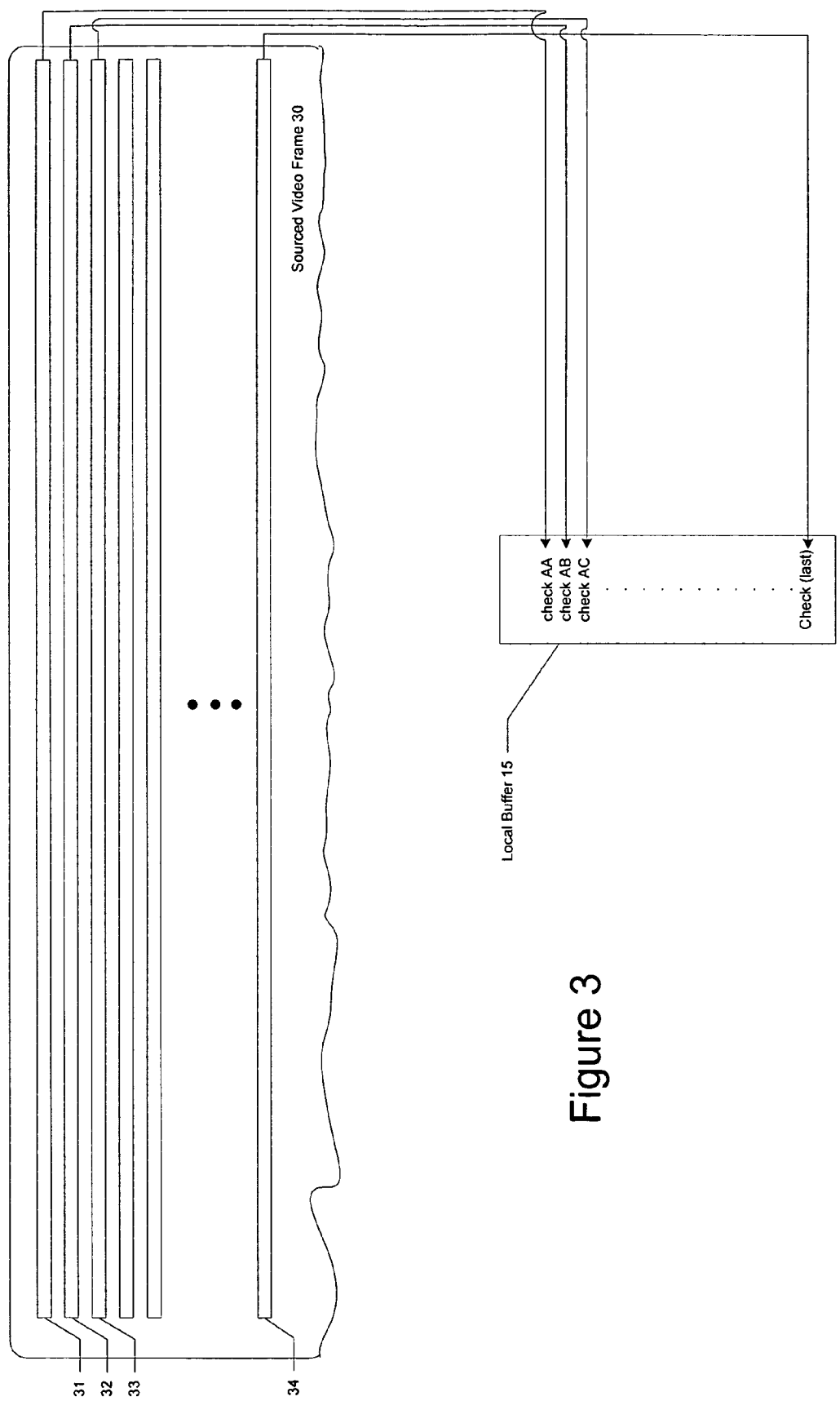
FIG. 3 is a schematic representation of example video compression processing.

The encoding steps are shown schematically in FIG. 3. There, a sourced video frame 30 from source video 10 is presented to the FPGA chip 14, pixel-by-pixel and line-by-line. One line 31 is received by the FPGA chip and the FPGA computes a check value for all of the pixels on that line.

The check value operation can be any kind of determinative operation. The simplest may be a check sum in which the bit values of the pixels are summed. Any other kind of determinative operations could also be employed. Check value algorithms are widely-known and vary widely. Any of the known check-sum, cyclic redundancy check or other determinative algorithms may be employed, and check values or determinative algorithms designed in the future may be employable as well. Whichever check value algorithm is chosen, it should in ideal situation yield a value that is uniquely associated with that object, like a fingerprint. There is, however, a trade-off between degree of distinction and size/complexity of the check value. A check value that is long and complex may be virtually guaranteed to uniquely correspond to a particular line encoding, but it may also be so long and complex that its determination or storage impedes the desirable results of encoding the video quickly and storing the check value locally. That is, a check value that takes too long to compute will hold up the delivery of the video line to the decoder (10's of thousands of lines may be moving each second). Also, a check value that is itself too long may fill the local buffer 15 of the FPGA will check sum values, leaving no further buffer space available for general FPGA processing.

With any check value algorithm, it is possible that the same value could be inadvertently created for two different screens, so the preferred check value algorithm would be one that minimized this probability. Check value algorithms that include pixel position in the calculation are preferred because they minimize inadvertently creating the same value for different video screens that typically occur sequentially, such as a cursor moving horizontally and relocating along a video line. A method of periodically updating the decoder's video screen without relying on the check value could also be included since the chance of inadvertently creating the same value for two different screens can be minimized but never completely eliminated. A 16-bit check value has a 1 in 65,536 chance of inadvertently creating the same value for two different screens.

The trade-offs for selecting pixel group size interact with the trade-offs for selecting the length of the check value. Larger groups require fewer check values per frame but are more wasteful when network throughput is insufficient. The amount of buffer memory available and the expected network throughput are key factors in selecting the optimal value for both of these values.

Figure 4:
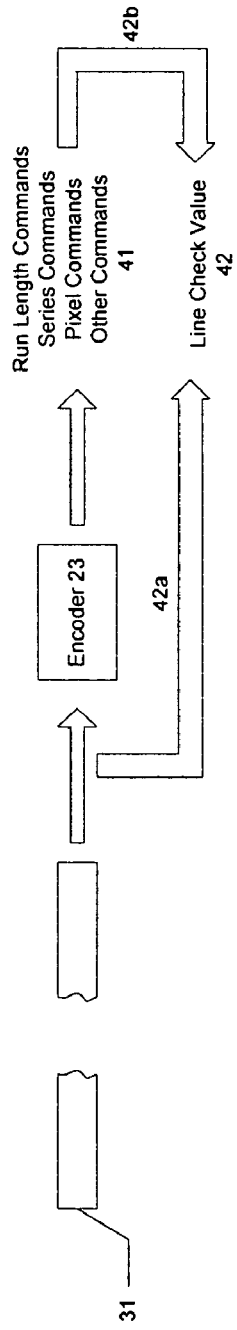
FIG. 4 is another schematic representation of example video compression processing.

Once an appropriate check value algorithm is chosen and employed on the pixels of line 31 of FIG. 3, it is stored as "Check AA" in local buffer 15 and the encoded line is sent to the decoder 18. The process is also shown in FIG. 4, where the line 31 is sent to the encoder 23 from the source video 10. The encoder 23 encodes the line 31 as run-length, series, pixel, and other commands 41, calculates a check value 42 based on all of the incoming pixels on the line, and loads the check value into an addressed memory location of the local buffer 15 for the particular line 31. As shown in FIG. 4, the check value step 42 can be performed either before encoding at step 42a, after encoding at step 42b or both. The next line, line 32 (FIG. 3), is then received, encoded, check-valued into "Check AB," and delivered to the decoder 18. The process continues for the next line 33, all the way through the last line 34, whose encoded line check value is stored in local buffer 15 as "Check (last)."

Figure 5:
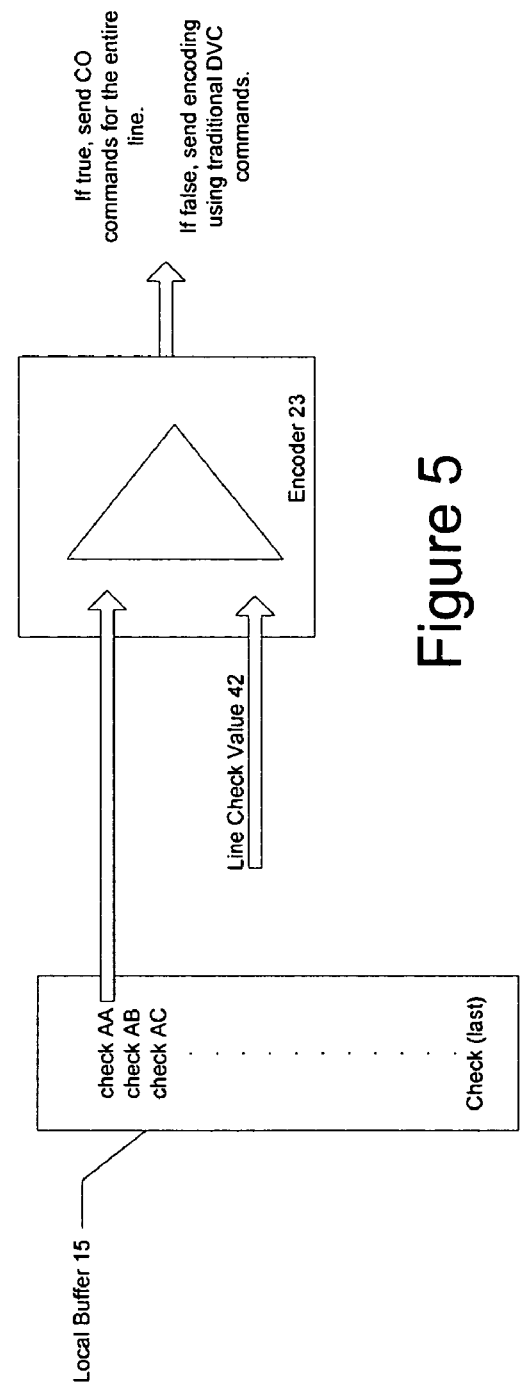
FIG. 5 is an example comparison function in the encoder.

Referring to FIG. 5, when the next frame arrives at the encoder 23 from the source video 10, the first line, line 31, the check value determination is made again for the pixels on the current line. That check value 42 (FIG. 5) is used by the encoder 23 to compare with the check value AA associated with the same line from the previous frame. If the comparison yields a match (i.e. it is "true") then the line is encoded as "copy old" for a run-length equal to the entire line. Since the encoder 23 knows the resolution of the frame (including the line length), it does not resort back to actual pixel values of the line 31; it simply sends a code indicating "copy old [line length]" or amends the line length to a previous uncompleted "copy old" command if one is in process. The check value AA then remains the same—it is not overwritten.

If during the comparison of FIG. 5 between the current check value 42 and the stored check value AA, a match is not made (i.e. it is "false"), then actual encoding for the current line (Other copy commands such as copy left or copy above) is sent to the decoder. The check value 42 is then overwritten into the memory location where "Check AA" is so the next time the line 31 (of the next frame) is encoded, the now-current, then-previous check value will be stored in the check value buffer for comparison purposes.

Figure 6A:
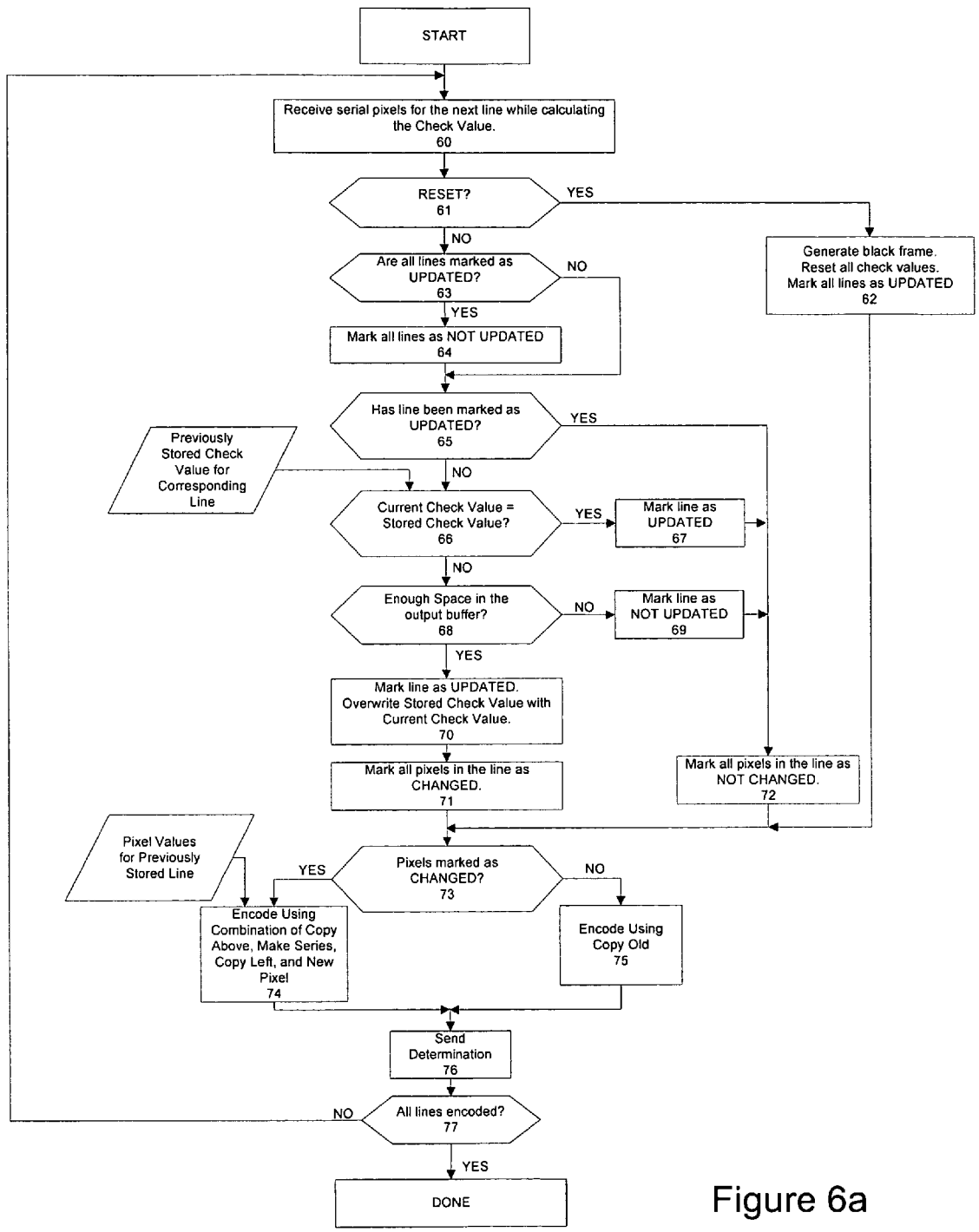
FIG. 6a is a flow chart of an example video compression process.
Figure 6B:
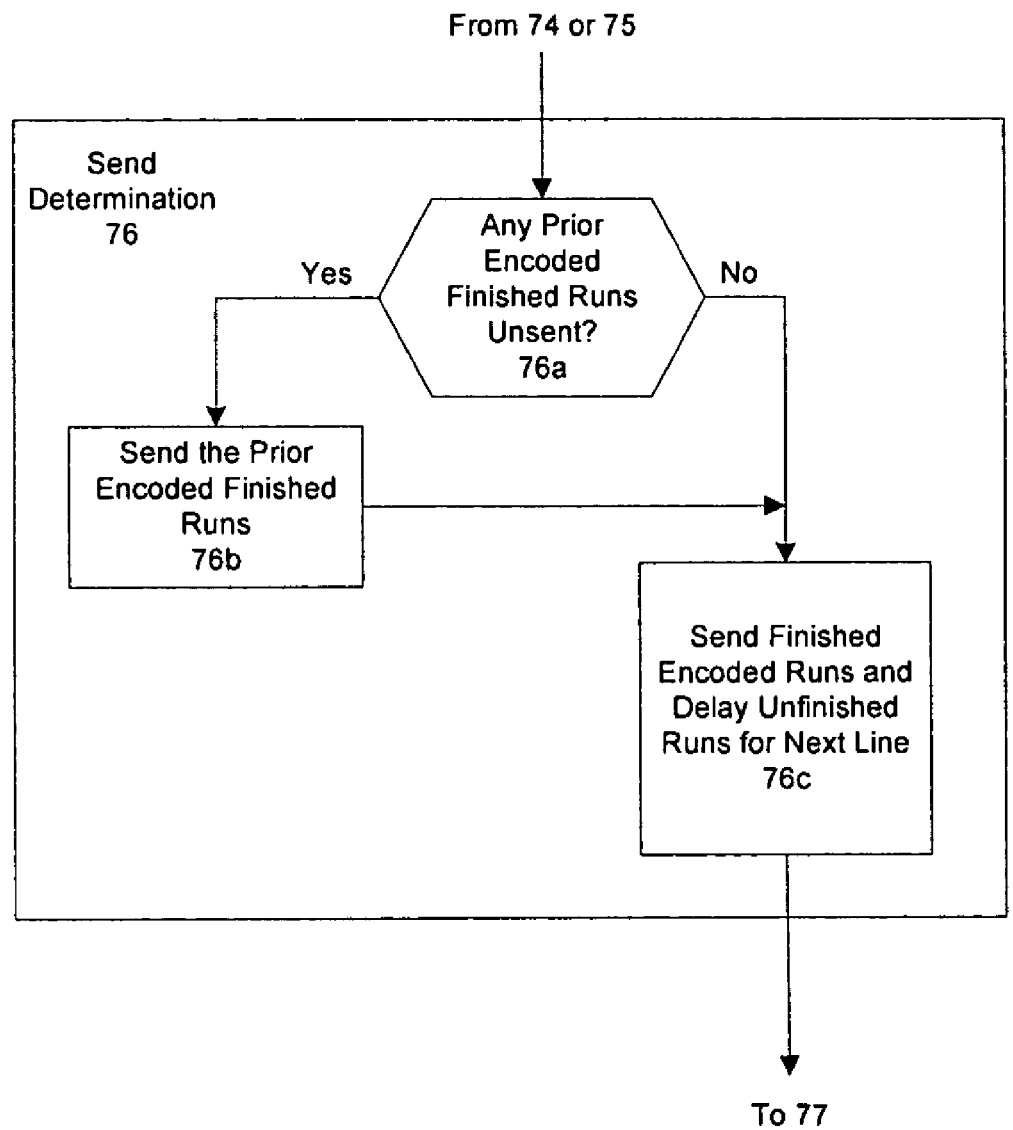
FIG. 6b is a flow chart of an example send determination process.

FIG. 6a is a flow chart of an example process. In step 60, a line of pixel values are received from the source video 10 by the encoder 23 and the check value for the line is calculated. In step 61, a determination is made whether a RESET condition has occurred. Any of the following events can trigger a RESET condition: the first line of the frame being received, a reset, a resolution change, or a frame initialization reset. In the event of a RESET condition, a black frame is generated, all check values are reset, and all lines are marked as UPDATED at step 62. The black frame is then encoded and packets corresponding to the initial black frame are sent to decoder 18. This insures that the decoder 18 has an initial reference for the lines of the next frame that is received.

At step 63 a determination is made as to whether all lines are marked as UPDATED. A line is marked as being updated when it has been encoded and sent to the decoder 18 using step 74 for the first frame and step 74 and 75 for the rest of the frames. An "all lines marked as UPDATED" condition occurs when all of the lines have been encoded and sent to the decoder 18. This means the decoder 18 has been refreshed or UPDATED with new pixel data for each line for an entire frame. If all lines are not marked as UPDATED, then only the lines that have not been UPDATED, will be encoded and sent to the decoder 18. All of the other lines will be encoded using the copy old command. Once all of the lines have been marked as UPDATED, it is time to start over with a new frame so at step 64 all the lines will be marked as NOT UPDATED to allow new information for each line to be sent to the decoder 18.

At step 65, a determination is made as to whether the line has been marked as UPDATED. If the line has already been marked as UPDATED, all the pixels in the line are marked as NOT CHANGED at step 72. If the line has not been marked as UPDATED, at step 66, the check value of the line is compared with the previously-stored check value for the corresponding line. If the check values are equal (i.e. the current line is the same as the corresponding line within a threshold amount of deviation) the line is marked as UPDATED at step 67 and the pixels are marked as NOT CHANGED at step 72.

If the check values are not equal, at step 68, a determination is made as to whether there is enough space in an output buffer to encode the current line using all the encoding commands. Lack of space in the output buffer can occur when network throughput is insufficient to transmit previously encoded lines. When there is not enough space in the output buffer, buffer space is conserved by marking the pixels of the current line as NOT CHANGED at step 72 which will generally allow the line to be encoded using less buffer space. Since, the pixels of the line are inaccurately marked as NOT CHANGED the line is marked as NOT UPDATED at step 69.

If there is enough space in the output buffer to encode the line using all the encoding commands, the line is marked as UPDATED and the stored check value is overwritten by the current check value at step 70. Further the pixels in the line are marked as CHANGED at step 71.

Once the pixels of the line have been marked as CHANGED or NOT CHANGED, the encoding process begins at step 73. At step 73, a determination is made as to whether the pixels are marked as CHANGED or NOT CHANGED. When the pixels are marked as CHANGED the pixels of the line are encoded using the standard DVC commands (i.e., CA, CL, MS, and MP) at step 74. To encode using the copy above command the pixels values need to be compared to the pixel values from the previous line. When the pixels are marked as NOT CHANGED as is the case when the line has already been marked as UPDATED, the check values are equal, or there is not enough buffer space to encode the line using the standard DVC commands, the line is encoded by copying the corresponding line from the previous frame at step 75.

Once a line is encoded using either the standard DVC commands or by copying the corresponding line from the previous frame a encoded line is sent to the output buffer and a determination is made as to whether the line should be sent to the decoder at step 76. The send determination step is shown in more detail in FIG. 6b.

To make encoding more efficient lines should not be sent immediately once they are encoded due to the fact that an encoding command may extend to the next line. For example, a copy above command may continuously apply for the last pixels of the current line and first pixels of the next line. Thus, unfinished runs are not sent even though they continue from one frame to another. Further, an encoded finished run may not have been sent to due insufficient network throughput. In serial video, encoded runs need to be sent in order. Thus, at step 76a, a determination is made as to whether any prior encoded finished runs remain unsent. If so, the encoded finished runs are sent at step 76b. After the prior encoded finished runs are sent or if no unsent prior encoded finished runs exist, the finished encoded runs of the current line are sent and unfinished runs are delayed at step 76c.

At step 77, it is determined whether all the lines are encoded. If all the lines are encoded, the process is done. If not, the process repeats until all the lines are encoded.

Figure 7:
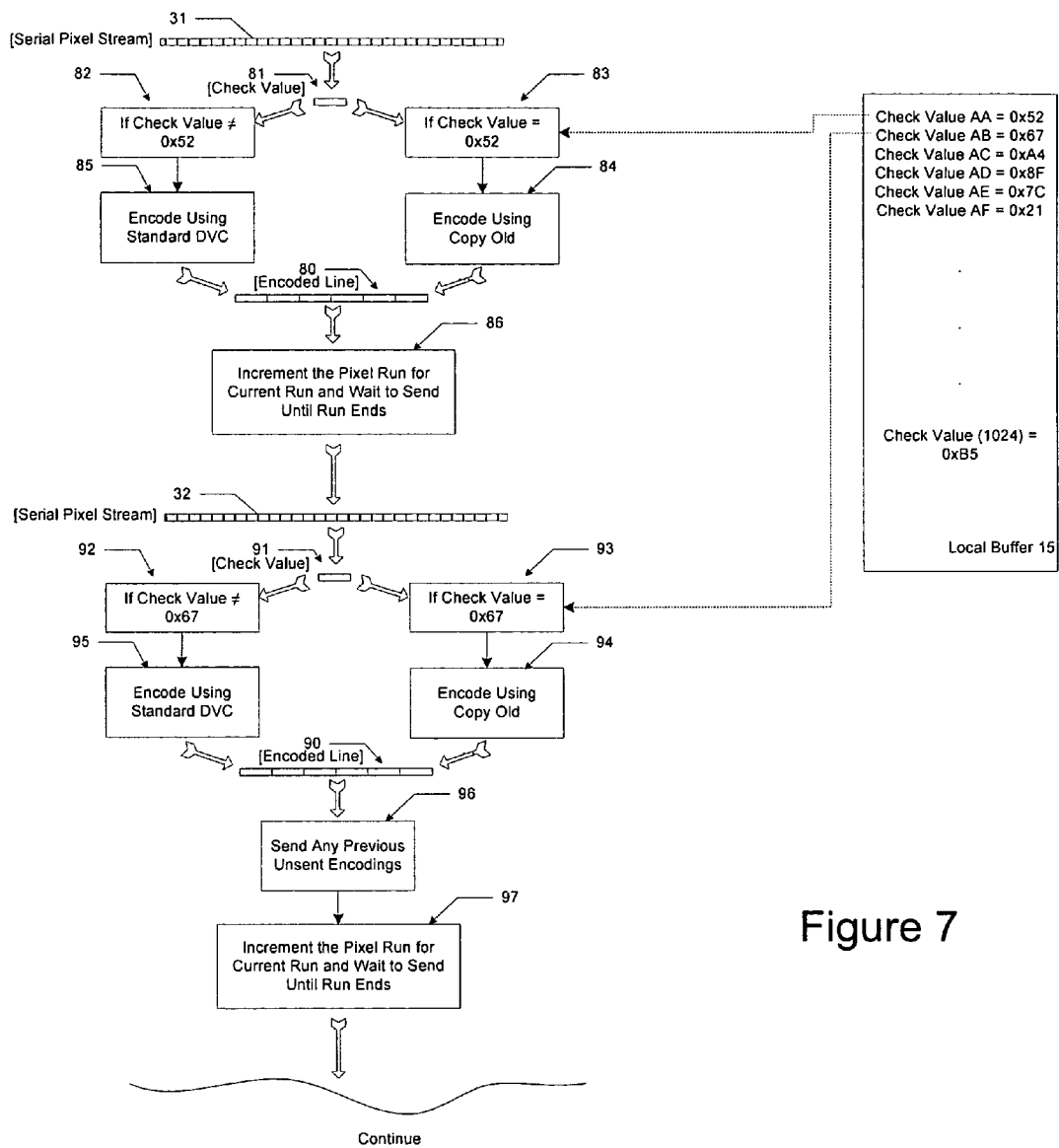
FIG. 7 is a schematic representation of an example video compression process.

FIG. 7 illustrates another alternative schematic of an example system in which the pixel line 31 in a serial pixel stream is received by the encoder 23. FIG. 7 is a simplified case of the process of FIG. 6 in which it is assumed that there is sufficient space in the output buffer and network throughput is sufficient to send encoded lines. The encoder 23 runs the check value algorithm on the line of pixels to determine the corresponding (ideally, unique) check value 81 for line 31. As shown, the local buffer 15 has already stored a prior check value for that line at location AA equal to "0x52." If the current check value 81 equals 0x52, at step 83, the encoder presumes the "copy old" command applies to the entire line 31, at step 84. It should be noted that it may turn out that the check value for a current line is only coincidently the same as for a previous line that is really substantively different; but, such situations are unlikely and in the exceedingly rare event that they do happen, they will be quickly overwritten by the next corresponding frame line. The check value methodology and sophistication can be chosen to correspond to the level of false matches that can be tolerated.

If the encoder finds no match between the current check value 81 and the stored value at step 82, the serial pixel stream 31 is encoded using standard DVC commands and the mismatch check value from step 82 is then over-written into the local buffer 15 at the location corresponding to the line (in this case, Check Value AA).

Thus, using standard DVC encoding or encoding using the check sum and "Copy Old" commands, encoded line 80 is generated. When a command applies to the last pixels of a line (e.g. CA, CL, CO, MS) the encoder 23 does not immediately send the pixels for which the command applies, but instead increments a running counter that counts the number of pixels in the previous and current lines that qualify for the command. This improves the efficiency of the compression by not terminating runs prematurely and thus increasing the run lengths where appropriate. The process of incrementing the counter and waiting for the next line is shown at step 86 (and again, later at step 97). FIG. 7 assumes that network throughput is sufficient to send encoded lines.

Then, the next line 32 arrives at the encoder 23 and its associated check value is determined and compared with the previously stored value of 0x67. Again, if the check value matches, at step 93, then the "copy old" command is again presumed at step 94. If a match does not occur, at step 92, the serial pixel stream 32 is encoded using standard DVC commands at step 95 and the check value stored in the local buffer 15 corresponding to the line (in this case, Check Value AB) is overwritten. If there is sufficient network throughput, shown at step 96, then any unsent encodings (from, for example, encoded line 80) are compiled and sent based on a run equal to the counter value, followed by the finished encodings of current code stream 90. The process then continues from line-to-line and frame-to-frame, indefinitely.

Figure 8:
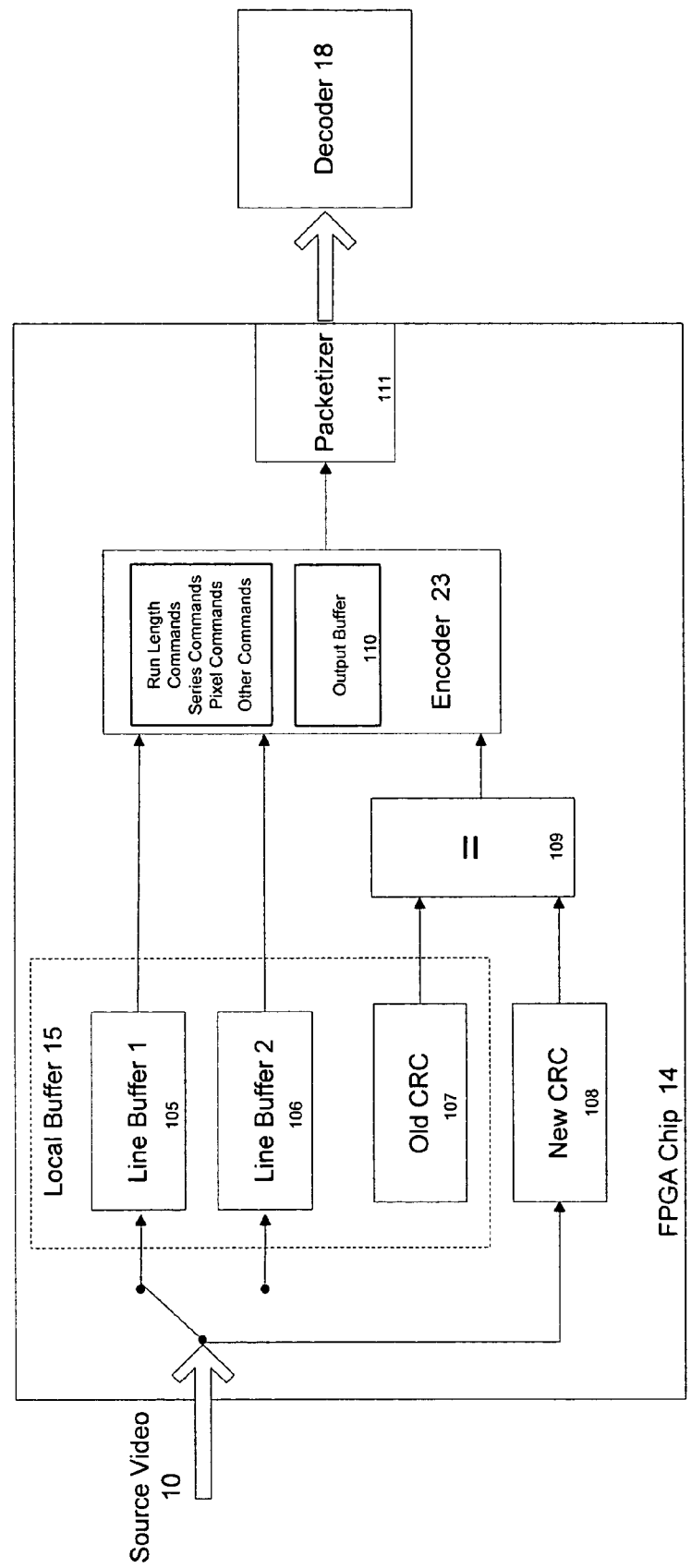
FIG. 8 is an example system with exemplary detailed video compressor components.

FIG. 8 is a block diagram with an exemplary detailed view of FPGA Chip 14. FPGA Chip 14 receives source video 10 and stores lines of pixel data in the local line buffers 105 and 106 of the Local Buffer 15. The local buffer 15 is able to store the current line and the previous line by alternating which local line buffer received lines are stored to. FPGA 14 calculates a check value 108 for a line while the pixel data for the line is being received. Comparison block 109 compares the newly calculated check value 108 to the old check value 107 and passes the information to the encoder 23. The encoder 23 then encodes the line and the Old CRC 107 may be replaced by the New CRC 108 as described in FIG. 6. Encoded lines are stored in the output buffer 110 until they are sent to the packetizer 111 at which point they are packetized and sent to the decoder 18.

Figure 9:
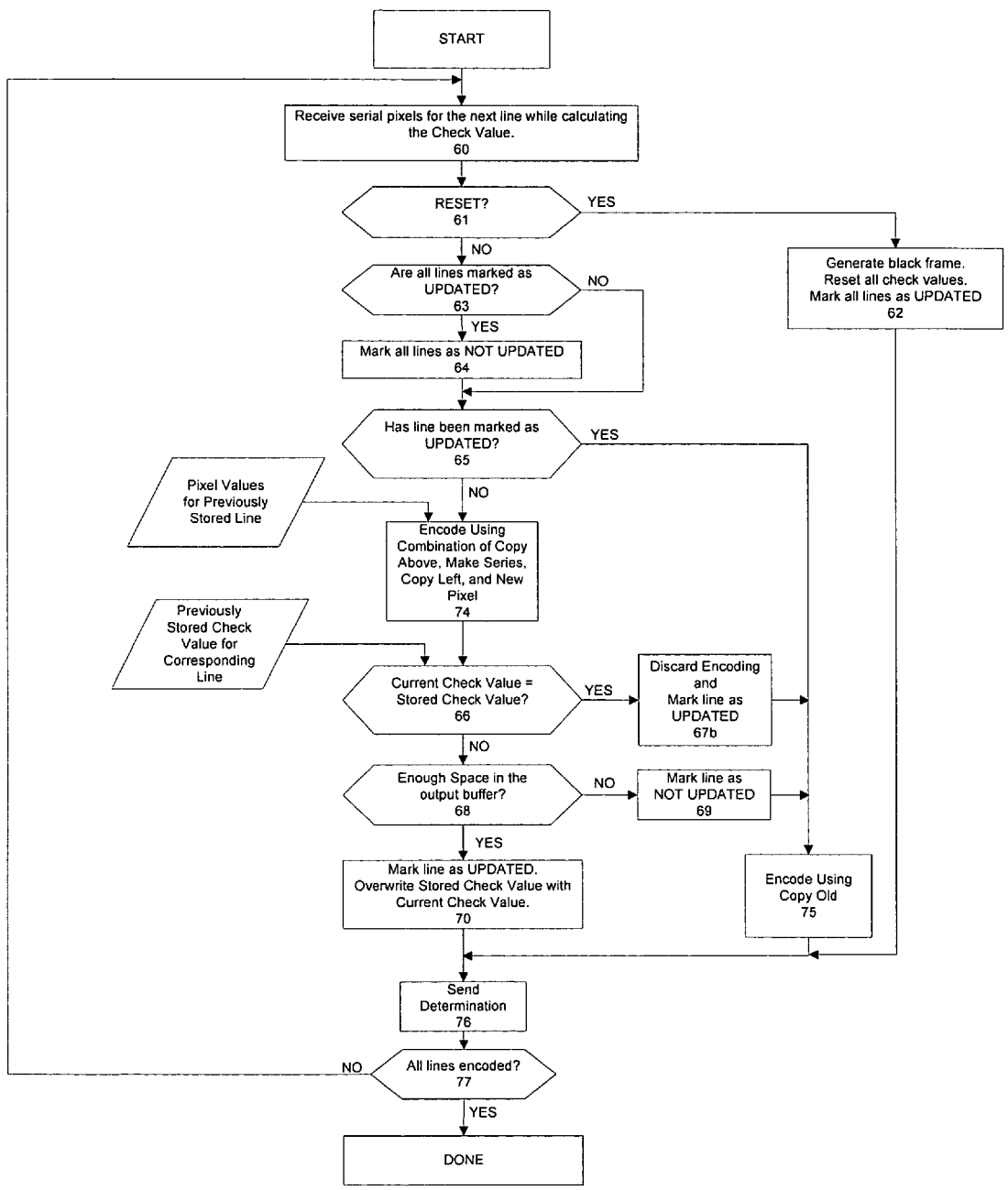
FIG. 9 is a flow chart of an example video compression process.

FIG. 9 shows a flow chart of an alternative example process. FIG. 9 illustrates a so-called "on-the-fly" encoding embodiment. Steps in FIG. 9 are similar to like-numbered steps in FIG. 6 and for the sake of brevity will not be repeated herein. However, in FIG. 9 pixels are encoded using the standard DVC commands (i.e. CA, CL, MS, and MP) at step 74 before the check values are compared at step 66. By encoding using standard DVC commands before check values are compared, pixels do not have to be marked as CHANGED or NOT CHANGED and steps dedicated to marking pixels CHANGED or NOT CHANGED and determining such can be eliminated. Further, since the check values are not compared until after the pixels are encoded using the standard DVC commands, the check value for an incoming stream of pixels can be calculated before, after, or while pixels are being encoded. As shown in FIG. 9, if it is determined that the check values match at step 66 previous encodings using the standard DVC commands are discarded at step 67*b* and the line is encoded using Copy Old at step 75.

Although the disclosure describes and illustrates various embodiments of the invention, it is to be understood that the invention is not limited to these particular embodiments. Many variations and modifications will now occur to those skilled in the art of backup communication. For full definition of the scope of the invention, reference is to be made to the appended claims.

We claim:

1. A video encoder receiving a serial stream of pixel data corresponding to groups of pixels in a video frame of information, comprising:
   a processor in a chip, with a local operating buffer also in the chip, programmed to:
   determine a check value for the pixels of a given group based on a check value algorithm,
   store the check value for the given group in a memory location of the local operating buffer corresponding to the given group,
   encode the pixels of the given group into a code stream based on an encoding algorithm,
   continue the determining, storing, and encoding operations until the frame of information is encoded, and
   for a next video frame of information:
   determine a current check value for the current group of pixels based on the same check value algorithm,
   encode the pixels of a given current group into a current code stream based on the same encoding algorithm,
   compare the current check value with the stored value for the corresponding given group of the previous frame, and
   if the current check value is the same as the stored value for the corresponding given group of the previous frame, preparing a copy command instructing a decoder to copy the pixel values of the given group of the previous frame, and
   if the current check value is not the same as the stored value for the corresponding given group of the previous frame, sending the current code stream to the decoder and overwriting the current check value to the memory location of the local operating buffer corresponding to the given group.

2. The video encoder of claim 1, wherein a group of pixels is defined as a single line of a video frame.

3. A method of encoding a video stream comprising the steps of:
   defining corresponding groups of pixels for video frames of a video stream;
   receiving a serial stream of pixel data corresponding to a given group of pixels in a first video frame;
   determining a check value for the pixels of the given group based on a check value algorithm;
   storing the check value for the given group in a memory location corresponding to the given group;
   encoding the pixels of the given group into a code stream based on an encoding algorithm;
   continuing the determining, storing, and encoding steps for all the groups of pixels within the frame until the frame of information is encoded;
   receiving a serial stream of pixel data corresponding to a given group of pixels in a next video frame of information and;
   for a next video frame of information:
   determining a current check value for the given group of pixels based on the same check value algorithm,
   comparing the current check value with the stored value for the corresponding given group of the previous frame, and
   if the current check value is the same as the stored value for the corresponding given group of the previous frame, preparing a copy command instructing a decoder to copy the pixel values of the given group of the previous frame, and if the current check value is not the same as the stored value for the corresponding given group of the previous frame, sending the current code stream to the decoder and overwriting the current check value to the memory location of the local operating buffer corresponding to the given group.

4. The method of claim 3, wherein the defining step defines groups of pixels as a single line of a video frame.

5. A video encoder receiving a serial stream of pixel data corresponding to groups of pixels in a video frame of information, comprising:
  a processor in a chip, with a local operating buffer also in the chip, programmed to:
    determine a check value for the pixels of a given group based on a check value algorithm,
    store the check value for the given group in a memory location of the local operating buffer corresponding to the given group,
    encode the pixels of the given group into a code stream based on an encoding algorithm,
    continue the determining, storing, and encoding operations until the frame of information is encoded, and
    for a next video frame of information:
      determine a current check value for the current group of pixels based on the same check value algorithm,
      compare the current check value with the stored value for the corresponding given group of the previous frame, and
      if the current check value is the same as the stored value for the corresponding given group of the previous frame, preparing a copy command instructing a decoder to copy the pixel values of the given group of the previous frame, and
      if the current check value is not the same as the stored value for the corresponding given group of the previous frame, encoding the pixels of a given current group into a current code stream based on the same encoding algorithm, sending the current code stream to the decoder and overwriting the current check value to the memory location of the local operating buffer corresponding to the given group.

6. The video encoder of claim 5, wherein a group of pixels is defined as a single line of a video frame.

7. A method of encoding a video stream comprising the steps of:
  determining a check value for the pixels of a given group based on a check value algorithm,
  storing the check value for the given group in a memory location of the local operating buffer corresponding to the given group,
  encoding the pixels of the given group into a code stream based on an encoding algorithm,
  continuing the determining, storing, and encoding operations until the frame of information is encoded, and
  for a next video frame of information:
    determining a current check value for the current group of pixels based on the same check value algorithm,
    comparing the current check value with the stored value for the corresponding given group of the previous frame, and
    if the current check value is the same as the stored value for the corresponding given group of the previous frame, preparing a copy command instructing a decoder to copy the pixel values of the given group of the previous frame, and
    if the current check value is not the same as the stored value for the corresponding given group of the previous frame, encoding the pixels of a given current group into a current code stream based on the same encoding algorithm, sending the current code stream to the decoder and overwriting the current check value to the memory location of the local operating buffer corresponding to the given group.

8. The method of claim 7, wherein a group of pixels is defined as a single line of a video frame.

* * * * *